(12) United States Patent
Sprague et al.

(10) Patent No.: US 7,676,482 B2
(45) Date of Patent: *Mar. 9, 2010

(54) METHOD AND APPARATUS FOR PROVIDING DATA FROM A DATA SOURCE TO A DATA CONSUMER, AND FOR RENDERING DATA FROM A DATA PROVIDER TO AN INTERFACE

(75) Inventors: Roger W. Sprague, Redmond, WA (US); Daniel T. Travison, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 684 days.

This patent is subject to a terminal disclaimer.

(21) Appl. No.: 11/124,860

(22) Filed: May 9, 2005

(65) Prior Publication Data

US 2005/0210057 A1 Sep. 22, 2005

Related U.S. Application Data

(63) Continuation of application No. 09/649,254, filed on Aug. 28, 2000, now Pat. No. 6,961,900.

(51) Int. Cl.
*G06F 7/00* (2006.01)
(52) U.S. Cl. .................................. 707/101
(58) Field of Classification Search .......... 707/100, 707/101–104.1
See application file for complete search history.

(56) References Cited

U.S. PATENT DOCUMENTS

| 6,023,714 | A | | 2/2000 | Hill et al. |
| 6,078,923 | A | * | 6/2000 | Burrows ..................... 707/101 |
| 6,260,050 | B1 | | 7/2001 | Yost et al. |
| 6,300,947 | B1 | * | 10/2001 | Kanevsky ................... 715/866 |
| 6,484,150 | B1 | | 11/2002 | Blinn et al. |
| 6,626,958 | B1 | | 9/2003 | McCauley et al. |
| 6,668,354 | B1 | | 12/2003 | Chen et al. |
| 6,789,077 | B1 | | 9/2004 | Slaughter et al. |
| 6,792,466 | B1 | | 9/2004 | Saulpaugh et al. |
| 6,862,594 | B1 | | 3/2005 | Saulpaugh et al. |
| 6,868,447 | B1 | | 3/2005 | Slaughter et al. |
| 6,898,618 | B1 | * | 5/2005 | Slaughter et al. ............ 709/203 |
| 6,904,454 | B2 | * | 6/2005 | Stickler ..................... 709/213 |
| 7,096,224 | B2 | * | 8/2006 | Murthy et al. ............. 707/100 |
| 7,308,458 | B2 | * | 12/2007 | Vincent, III ................ 707/102 |

OTHER PUBLICATIONS

Lemay et al "Lemay's Web workshop Creating Commercial weppages", Sams Aug. 1996, chapter 14, and pp. 356-359.*
Betz, K., et al.: "Developing Highly-Responsive User Interfaces With DHTML and Servlets", Conference Proceedings of the 2000 IEEE International Performance, Computing, and Communications Conference, 2000, p. 437-443.
E. Meijer, et al. "Client-side Web Scripting with HaskellScript", Draft Sbmission for PADL, 1999, p. 1-17.

* cited by examiner

*Primary Examiner*—Pierre M Vital
*Assistant Examiner*—Sabana Rahman
(74) *Attorney, Agent, or Firm*—Workman Nydegger

(57) ABSTRACT

An apparatus and methodology are provided for obtaining data from a data source and providing the data to a data consumer, as well as for providing data from a data provider to an interface. The method provides for sending an origin request message to a data provider, receiving an origin response message having a presentation schema and data, and rendering the data to an interface by providing a presentation language representation of the data according to the presentation schema.

18 Claims, 26 Drawing Sheets

```
<DATASET>
    <SCHEMA_TYPES></SCHEMA_TYPES>
    <DATA></DATA>
    <ERROR></ERROR>
</DATASET>
```

```
<SCHEMA_TYPES>
        <ELEMENT_TYPE></ELEMENT_TYPE>
</SCHEMA_TYPES>
```

```
<ELEMENT_TYPE>
    <NAME></NAME>
    <TITLE></TITLE>
    <WIDTH></WIDTH>
    <ALIGN></ALIGN>
    <DISPLAY></DISPLAY>
    <TYPE></TYPE>
</ELEMENT_TYPE>
```

```
<DATA>
    <RECORD></RECORD>
</DATA>
```

FIG. 7D ↖ 306

```
<RECORD>
    <ID></ID>
</RECORD>
```

FIG. 7E ↖ 308

```
<ERROR>
    <NUMBER></NUMBER>
    <DESCRIPTION></DESCRIPTION>
</ERROR>
```
↖ 310

FIG. 7F

```
<DATASET>
    <SCHEMA_TYPES>
        <ELEMENT_TYPE>
            <NAME>ID</NAME>
            <TITLE>Record Id</TITLE>
            <WIDTH>100px</WIDTH>
            <ALIGN>left</ALIGN>
            <DISPLAY>1</DISPLAY>
            <TYPE>0</TYPE>
        </ELEMENT_TYPE>
        <ELEMENT_TYPE>
            <NAME>DSN</NAME>
            <TITLE>Data Source Name</TITLE>
            <WIDTH>100px</WIDTH>
            <ALIGN>left</ALIGN>
            <DISPLAY>1</DISPLAY>
            <TYPE>0</TYPE>
        </ELEMENT_TYPE>
    </SCHEMA_TYPES>                              }— 352
    <DATA>
        <RECORD>
            <ID>10008</ID><DSN>Northwind</DSN>
        </RECORD>
        <RECORD>
            <ID>10009</ID><DSN>Northwind2</DSN>
        </RECORD>
    </DATA>
    <ERROR></ERROR>    — 356
</DATASET>
```

350 — (label)
352 — schema types block
354 — data block
356 — error

FIG. 8A

```
<DATASET>
    <SCHEMA_TYPES>
        <ELEMENT_TYPE>
            <NAME>ID</NAME>
            <TITLE>Record Id</TITLE>
            <WIDTH>10px</WIDTH>
            <ALIGN>left</ALIGN>
            <DISPLAY>0</DISPLAY>
            <TYPE>0</TYPE>
        </ELEMENT_TYPE>
        <ELEMENT_TYPE>
            <NAME>NODE_TYPE</NAME>
            <TITLE>Node Type</TITLE>
            <WIDTH>1px</WIDTH>
            <ALIGN>left</ALIGN>
            <DISPLAY>0</DISPLAY>
            <TYPE>0</TYPE>
        </ELEMENT_TYPE>
        <ELEMENT_TYPE>
            <NAME>FilePath</NAME>
            <TITLE>File Path</TITLE>
            <WIDTH>100%</WIDTH>
            <ALIGN>left</ALIGN>
            <DISPLAY>1</DISPLAY>
            <TYPE>0</TYPE>
        </ELEMENT_TYPE>
    </SCHEMA_TYPES>                                    — 362
    <DATA>
        <RECORD>
            <ID>10008</ID>
            <NODE_TYPE>0</NODE_TYPE>
            <FilePath>C:\autoexec.bat</FilePath>
        </RECORD>
        <RECORD>
            <ID>10009</ID>
            <NODE_TYPE>1</NODE_TYPE>
            <FilePath>C:\WINNT</FilePath>
        </RECORD>                                       — 364
    </DATA>
    <ERROR></ERROR>                                    — 366
</DATASET>
```

METHOD AND APPARATUS FOR PROVIDING DATA FROM A DATA SOURCE TO A DATA CONSUMER, AND FOR RENDERING DATA FROM A DATA PROVIDER TO AN INTERFACE

RELATED APPLICATIONS

This application is a continuation of U.S. Ser. No. 09/649,254, filed on Aug. 28, 2000, entitled "METHOD AND APPARATUS FOR PROVIDING DATA FROM A DATA SOURCE TO A DATA CONSUMER, AND FOR RENDERING DATA FROM A DATA PROVIDER TO AN INTERFACE"—the entirety of which is incorporated herein by reference.

TECHNICAL FIELD

The present invention relates to the field of information processing in computer systems. More particularly, the invention relates to a method and apparatus for providing data from a data source to a data consumer and for rendering data from a data provider to an interface.

BACKGROUND OF THE INVENTION

In conventional computer system applications, data from a data source is rendered to an interface according to a presentation format or schema. In a common data binding method, a client application or system receives data of a known format from a data source, such as a database or a database management system. The client and the data source are each programmed in accordance with a common data schema. The client renders the data to a user, for example, via a user interface such as a display, by creating a presentation language representation of the data. The data presented to the client is always in the same format, thus allowing the client to render the data to the display in a predictable fashion.

This data transfer methodology provides a binding between a single client and a single data source. Although the client may buffer the data from the data source separately from display format information, the presentation to the user is not dynamic. Thus, where the data source format information changes, the client system needs to be reconfigured as well. Likewise, to bind the client to another data source, new code is required on the client side, in order to incorporate a different data format or schema. Thus, the data binding method does not provide for dynamic presentation of data from a changing data source, or from a plurality of disparate data sources.

Another data transfer methodology involves a thin client or three-tiered approach. In a typical situation, a user accesses a web site (e.g., the middle tier) using a browser, and performs a data search. The web site server accesses a data source, and obtains search results therefrom. The data source provides the search results to the web site in a known data format or schema, which the web site then formats for display purposes. The web site then creates a presentation language representation of the data from the data source, which may then be provided to the browser. For example, the web site may create a hypertext markup language (HTML) file or document, which is then sent to the browser for display to the user.

The browser thus does not receive data separate from the display formatting. The client browser is a thin entity, since it performs no formatting tasks, whereas the middle tier or web site server creates the presentation language representation of each page of data sent to the browser. Moreover, the thin client approach does not allow the user to buffer or accumulate the data underlying the presentation language representation. Instead, the browser can only buffer the HTML or other presentation language files or pages received from the web page.

Another limitation of the three-tiered approach is encountered where large amounts of data are accessed. Some data sources may contain large amounts of data or information. For example, some databases accessible to users of the Internet contain millions of records. Where a user requests data via a web site from such a large data source, the web site server creates a presentation language representation (e.g., HTML file) of the entire search result set from the data source, which must then be downloaded to the user's computer via the browser. Unfortunately, Internet users may have to wait for large file downloads to complete before being able to access the desired data. This is inefficient where, for example, a user wishes to access one or a small number of records in a huge database or other data source. Alternatively, the system may page the data, but the requests are explicit to the user.

A database is a collection of related data that may be stored on a memory or storage medium as part of a data source system. Data in the database is commonly organized in a two-dimensional row and column form, where each row is a record with elements in one or more columns. A data record is a row of data in the table that is identified by a unique record identifier. A field is a data subdivision of a record to the extent that a column of data in the database represents the same field for each record in the database. Each field in a record is a data element, which may be identified by a unique field name, and a field name remains the same for the same field in each record of a table in the database. Therefore, a specific data element in a database table is referenced by identifying a record identifier and a field name.

Display of data records to a data consumer is typically accomplished according to a known format for a particular data type being displayed. Some data records may be longer than others, some may be images, some may be text, etc. Many different data types and desirable display formats are possible. HyperText Markup Language (HTML) is a document format used on the World Wide Web. Web pages are built with HTML tags, or codes, embedded in the text. HTML defines the page layout, fonts and graphic elements as well as hypertext links to other documents on the Web. Hypertext is a linkage between related text. Conventional web browsers communicate with web servers via the Transmission Control Protocol/Internet Protocol (TCP/IP). The browser sends HyperText Transfer Protocol (HTTP) requests to the web site server, which responds with HTML pages and possibly additional programs in the form of ActiveX controls or Java applets.

Conventional methodologies and systems for data transfer thus fail to provide dynamic presentation of data from a changing source, along with data separation from display information and buffering. Data binding methods are limited to a single source for each client, and require recoding to bind a client to another data source unless the data format is the same. The binding between a client and a data source is thus not reusable. Three-tiered approach may allow dynamic presentation. However, this method requires the user to download the entire set of data, and provides no separation of data and display format information, thus preventing caching of data by the client or user. In addition, the three-tiered approach requires the creation of the presentation language representations to be accomplished by the middle tier. Thus, there remains a need for data transfer systems and methodologies which provide for dynamic presentation of data from data sources with an indeterminate data format, which is capable of being bound to different data sources, which provides separation of data from display information, and which allows the creation of presentation language representations of the data to be performed outside of the data provider.

SUMMARY OF THE INVENTION

The present invention minimizes or overcomes the shortcomings of the prior art through the provision of apparatus and methodologies for obtaining data from a data source and rendering the data to a user interface. An apparatus and methodology are provided for obtaining data from a data source and providing the data to a data consumer, as well as for rendering data from a data provider to an interface, such as a display. A data consumer determines that a user desires data from a data provider, and sends an origin request message to a data provider. An origin response message is received from the data provider having a presentation schema. Data from the data source may be received from the data provider in the origin and/or subsequent response messages. The data is then rendered to an interface by the data consumer by providing a presentation language representation of the data to an interface according to the presentation schema. Subsequent requests may be made, in response to which the data provider sends further data packets, which are formatted by the data consumer for display according to the presentation schema received in the origin response to the origin request. The amount of data sent by the data provider is controlled according to a length parameter in the data consumer request messages. Each request may be exclusive of the last cached record in the data consumer.

This methodology allows the user to obtain a known amount of data from a potentially large data source, without having to wait for the entire data set to be downloaded to the data consumer. In addition, the presentation is dynamic since the data consumer obtains the presentation information or schema for the data with each origin request to the data provider. Thus, where a data source changes (e.g., where another column of data is added to a data source database), the data provider sends a different presentation schema to data consumers thereafter accessing the data provider. In addition, subsequent origin request messages may be sent, whereby updated presentation schemas may be obtained.

Moreover, since the data consumer is provided with data separate from the presentation schema information, the data may be buffered by the data consumer apart from the display formatting information. In addition, the methodology allows the data consumer to easily connect to other disparate data providers, since the disparate presentation schemas associated therewith will be supplied upon connection thereto. The invention further provides computer-readable media having computer-executable instructions for performing the various methods of the invention.

According to one aspect of the present invention, a method is provided in a data consumer for obtaining data from a data provider and rendering the data to an interface. The method comprises sending a first or origin request message to a data provider which may include an origin record identifier and a record count identifier, receiving a first or origin response message from the data provider having a schema component and a data component, and rendering data from the data component to the interface according to the schema component. The data provider may thus provide presentation information in a schema component of the response message, according to which the data consumer may create a display language representation of data in the data component, which is then rendered to the interface.

The data consumer may thereafter send a subsequent request message to the data provider having a record identifier, a record count identifier, and an optional direction identifier. Thereafter, the data consumer may receive a subsequent response message from the data provider having a data component, and render data from the data component of the subsequent response message to the interface according to the schema component of the first or origin response message. The subsequent response message thus provides data to the data consumer, which is separated from the presentation information. Many such subsequent requests and responses may be exchanged between the data consumer and the data provider, whereby the data consumer may obtain and render some or all of a particular data set to a user via the interface using the presentation schema. In addition, subsequent origin request messages may be sent, whereby the data provider may resend the existing or an updated presentation schema to the data consumer.

The schema component of the origin response message is used to render subsequently received data from the data provider to the interface. This separation of data and presentation information allows the data to be buffered by the data consumer without redundant presentation information. In addition, the data provided in the response messages may not exceed the record count identifier of the request messages. This allows the data consumer to obtain portions or chunks of data in a controlled fashion regardless of the size or amount of data in the data source. Thus, where a huge database is accessed, the user may obtain a few pages of data at a time without having to download the entire data source.

A data consumer implementing the method may advantageously be employed, for example, where a user interface provides a scrolling data display, and a user scrolls up and/or down through the displayed data records. In this case, the data already obtained from a data source via the data consumer and data provider, may be buffered in a cache memory or the like. As a user scrolls the display or iterates into data records already resident in the cache, they are accordingly displayed in the display. Where the user scrolls to the end of the cached records, the data consumer may send corresponding data request messages to the data provider, and receive and format the new data for rendering to the display.

Another aspect of the invention includes a method of providing data from a data source to a data consumer in a data provider. This method comprises receiving a first or origin request message from the data consumer having an origin record identifier and a record count identifier and constructing a first or origin response message having a schema component and a data component with data from the data source according to the origin record identifier and the record count identifier. The method further includes sending the first or origin response message to the data consumer. The response message may be constructed by querying a database and creating the data component according to the query results. The schema component provides the data consumer with the presentation information for rendering data from the data component to an interface, such as a computer display or a printer.

The method may further comprise receiving a subsequent request message from the data consumer having a record identifier and a record count identifier. The subsequent request message may further include a direction identifier, for example, to indicate whether the requested data is before or after data previously received. The method further includes constructing a subsequent response message having a data component with data from the data source according to the record identifier, the record count identifier, and the optional direction identifier, and sending the subsequent response message to the data consumer. The method allows the data provider to be connected to any data consumer, since the presentation schema is provided to the data consumer via an origin request which will occur when the connection is established. In addition, the data is provided separate from the presentation schema, allowing the data consumer to buffer the data as needed in a store separate from the presentation information.

According to yet another aspect of the invention, there is provided a method for providing data from a data provider to a data consumer. According to the method, the data provider receives a first or origin request message from the data consumer, which may include an origin record identifier, creates a first response message having a schema component according to the origin record identifier, and sends the origin response message to the data consumer. The method further includes receiving a subsequent request message from the data consumer which may include a record identifier, a record count identifier, and a direction identifier, constructing a subsequent response message having a data component according to the subsequent request message. For example, the subsequent response message may be constructed according to the record identifier, the record count identifier, and the direction identifier of the subsequent request message. The data component of the subsequent response message may include data from the data source. The data provider then sends the subsequent response message to the data consumer. By this method, the origin response message provides the data consumer with a presentation schema, which is then used in rendering data from subsequent response messages to the interface.

According to still another aspect of the invention, a method is provided for rendering data from a data provider to an interface. In accordance with this method, a data consumer initially sends an origin request message to the data provider, which may include an origin record identifier and a record count identifier, receives a first response message from the data provider, which may include a schema component, a data component, and an error component, and sends a subsequent request message to the data provider, which may include a record identifier, a record count identifier, and a direction identifier. The data consumer then receives a subsequent response message from the data provider, having a data component with data from the data source, creates a presentation language representation of the data from the data component according to the schema component of the origin response message, and renders the presentation language representation of the data from the data component to the presentation interface.

According to other aspects of the invention, there are provided a data consumer and a data provider, adapted to exchange request and response messages, as well as computer-readable media having computer-executable instructions for carrying out the various methodologies of the invention.

To the accomplishment of the foregoing and related ends, certain illustrative aspects and implementations of the present invention are hereinafter described with reference to the attached drawing figures. The following description and the annexed drawings set forth in detail certain illustrative applications and aspects of the invention. These are indicative, however, of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

The foregoing and other aspects of the invention will become apparent from the following detailed description of the invention and the attached drawings in which:

FIG. 7D is an illustration of an exemplary data collection in XML for a response message in accordance with the invention;

FIG. 7E is an illustration of an exemplary record definition in XML for a response message in accordance with the invention;

FIG. 7F is an illustration of an exemplary error collection in XML for a response message in accordance with the invention;

FIG. 8A is an illustration of an exemplary XML response message in accordance with another aspect of the invention;

FIG. 8B is an illustration of another exemplary XML response message in accordance with another aspect of the invention;

DETAILED DESCRIPTION OF THE INVENTION

Figure 1:
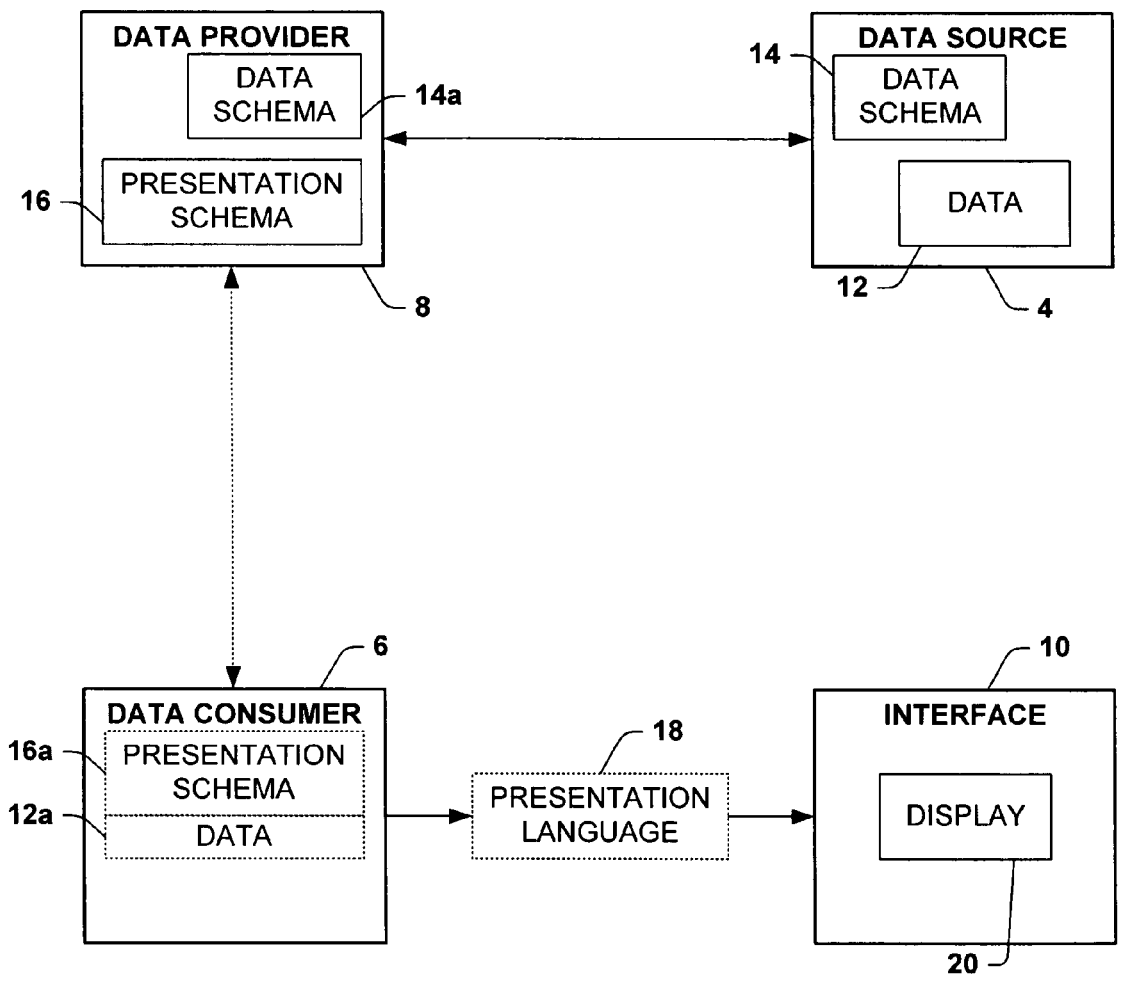
FIG. 1 is a schematic diagram illustrating an exemplary system for obtaining data from a data source and presenting the data to an interface in accordance with an aspect of the present invention.

The following is a detailed description of the present invention made in conjunction with the attached figures, wherein like reference numerals will refer to like elements throughout. According to the invention, an apparatus and methodology are provided for obtaining data from a data source and providing the data to a data consumer, as well as for rendering data from a data provider to an interface. The invention allows dynamic presentation of data from a data source, as well as data separation. The invention further provides a generic data consumer, which may be advantageously connected with disparate data providers for dynamic presentation of data to an interface.

In FIG. 1, an exemplary system 2 is illustrated for providing data from a data source 4 to a data consumer 6, and for rendering data from a data provider 8 to an interface 10. The data source 4 includes data 12 and is adapted to provide some or all of the data 12 to the data provider 8 in accordance with a data schema 14. The data provider 8 includes a copy 14a of the data schema 14, whereby data 12 may be provided to the data provider 8. Data provider 8 also includes a presentation schema 16 including presentation or format information related to displaying the data 12 in an interface (e.g., interface 10). The data provider is adapted to send a copy 16a of the presentation schema 16 and/or a data set 12a to the data consumer 6 via one or more messages (not shown). The data consumer 6, in turn, creates a presentation language representation 18 of the data set 12a according to the presentation schema 16a, which is then rendered to a display 20 of the interface 10.

In operation, a user (not shown) may request data from the data source 4 by performing an action in the interface 10 (e.g., using a scroll bar, up/down arrow keys, page up or page down keys, and the like). The data consumer 6 may then send a first or origin request message (illustrated and described in greater detail infra) to the data provider 8, including an origin record identifier, and optionally including a record count identifier. The data provider provides a first response message including the presentation schema 16A, and optionally the data set 12a, which may be a subset of the data 12 in the data source 4. The data consumer 6 then creates the presentation language representation 18 of the data set 12a, for example HTML or DHTML, according to the presentation schema 16A. The representation 18 is then rendered to the display 20 of the interface 10 for presentation to the user.

Subsequent request messages (not shown) may be sent by the data consumer 6, which include a record identifier and a record count identifier. The subsequent request messages may optionally include a direction indicator. The data provider 8 obtains another data set from the data source 14, and sends a subsequent response message to the data consumer 6 having the requested subsequent data (not shown). The data consumer 6 then creates a presentation language representation (e.g., representation 18) of the subsequent data according to the presentation schema 16a received from the data provider 8 in the first or origin response message. In the system 2, it is seen that the data consumer 6 is generic, since it can render data in a presentation language representation to the interface 10, according to presentation schema information it receives from the data provider 8. Thus, the data consumer may be advantageously connected to another data provider (not shown), from which it will receive another (possibly disparate) presentation schema and data.

It will also be noted that where the data source 14 changes, the data provider 8 may provide an updated presentation schema (not shown) to the data consumer 6, whereby dynamic presentation of changing data may be achieved. For example, the data provider 8 may be adapted to send further (and possibly unrequested) presentation schema information periodically or upon the occurrence of an event (e.g., a change in the data source4), and/or the data consumer 6 may be adapted to send further origin request messages, which may be periodic or event driven.

In addition, the data set 12a may be a subset of the data 12 in the data source 14. Thus, where the data 12 includes a large (and/or dynamically increasing) number of records, the data consumer 6 may request that only a certain number of records be sent, for example, via the request message record count identifier. Thus, small sets or chunks of data may be obtained from the data source 4 and rendered to the interface 10 without the user having to wait for the entire data source 12 to be downloaded, as is common in thin-client data transfer systems and methodologies.

Figure 2A:
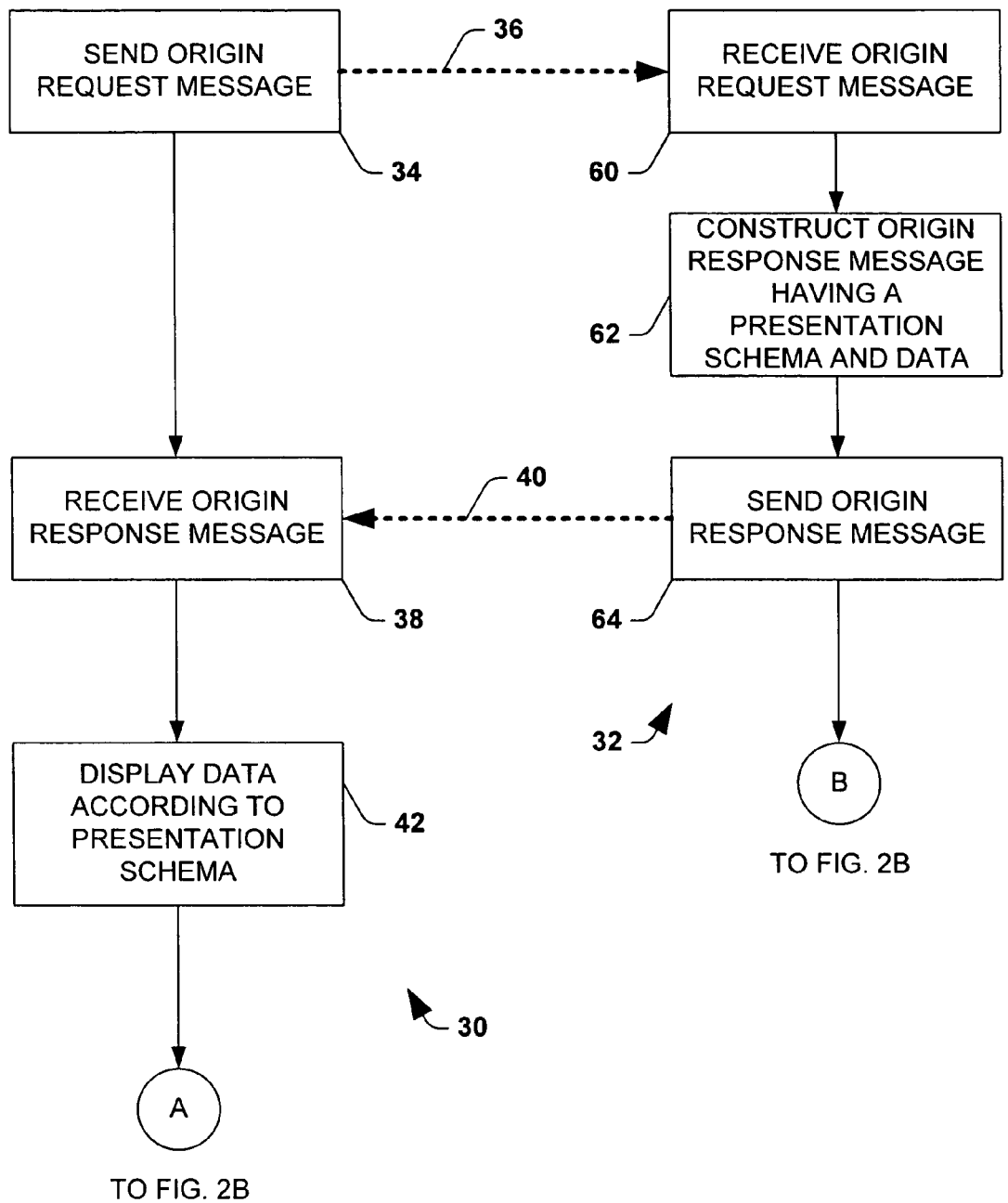
FIG. 2A is a flow diagram illustrating an exemplary method of providing data from a data provider to a data consumer, and a method for rendering data from a data consumer to an interface in accordance with another aspect of the invention.
Figure 2B:
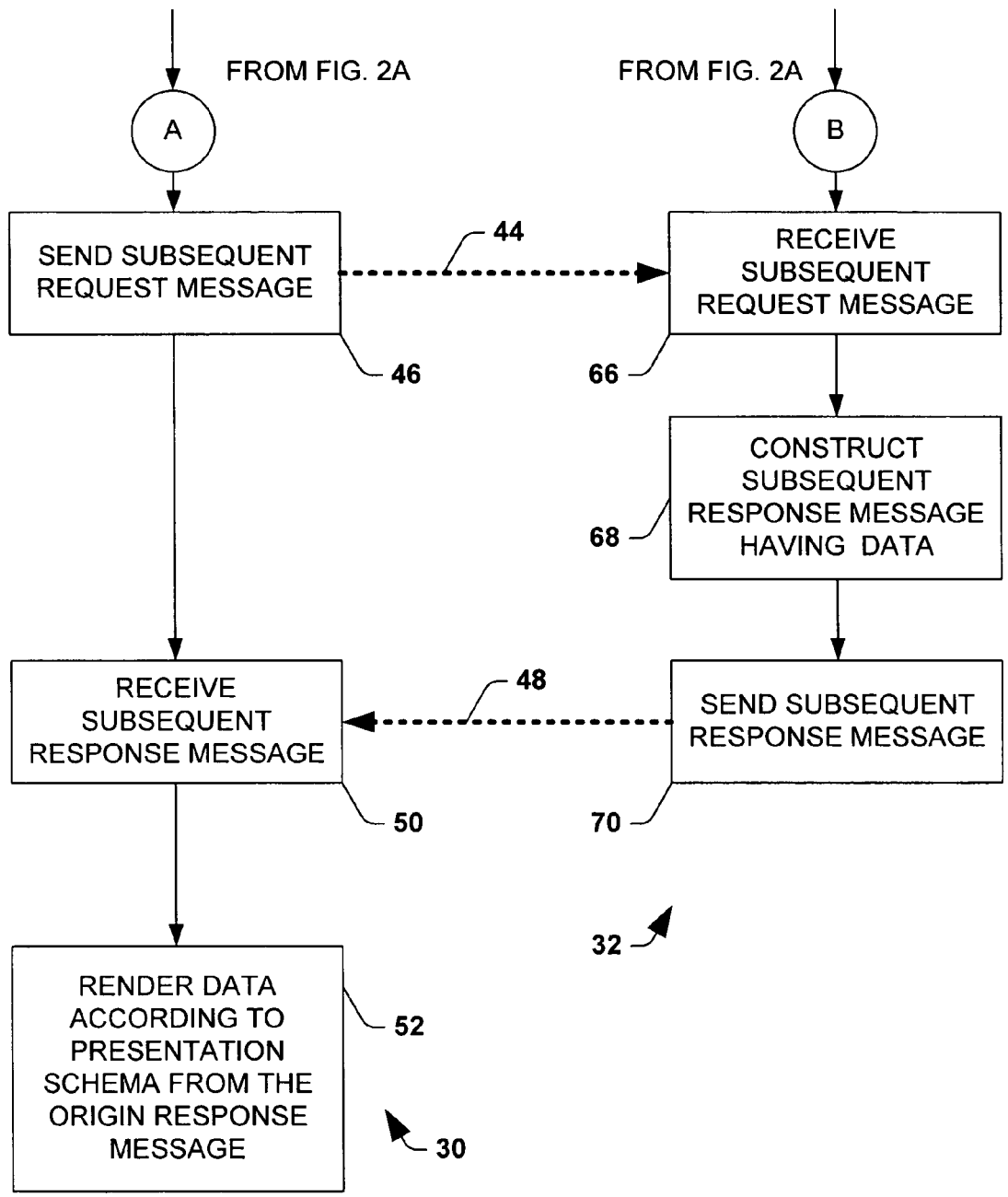
FIG. 2B is a flow diagram further illustrating the methods of FIG. 2A.

Referring now to FIGS. 2A and 2B, an exemplary method 30 of rendering data from a data provider to an interface is illustrated along with an exemplary method 32 of providing data from a data source to a data consumer in accordance with another aspect of the present invention. The methods 30 and 32 are illustrated in FIGS. 2A-2C with various messages therebetween for clarity. However, it will be appreciated that the methods 30 and 32 may be implemented in separate systems as well as in different components of the same system. For example, the method 30 may be implemented in the data consumer 6 of FIG. 1, and the method 32 may be implemented in the data provider 8. Furthermore, it will be recognized that the data consumer 6 may practice the method 30 in one computer system application, such as a browser, and the data provider 8 may implement the method 32 in another system, such as a web site server.

In FIG. 2A, the method 30 begins at step 34 wherein an initial or first request message 36 is sent, for example, from the data consumer 6 to the data provider 8. Such a message 36 may, but need not, be an origin message. The message 36 may include an origin record identifier and a record count identifier (as illustrated and described in greater detail infra), which specify an amount of data being requested. This allows the data consumer to obtain a subset of the data in the data source (e.g., data set 12a may be a subset of data 12 in data source 4 of FIG. 1). At step 38, the method 30 continues wherein an origin response message 40 is received, for example, from the data provider 8.

The origin response message may include a schema component (e.g., presentation schema 16a), a data component having data therein (e.g., data set 12a), and an optional error component (not shown), providing presentation formatting information, data, and error information, respectively. At step 42, the data received in the origin response message 40 at step 38 is displayed according to the schema received therewith. For example, the data consumer 6 may create a presentation language representation of the data (e.g., representation 18) and render the representation to the display 20 of the interface 10.

It will be appreciated that the provision of display formatting information or schema in the origin response message from the data provider allows the display by the data consumer of dynamically changing data. In addition, the amount of data provided in the response message 40 may be sized according to the record count identifier in the request message 36, thus advantageously providing data chunking. Referring also to FIG. 2B, a subsequent request message 44 is then sent to the data provider at step 46, after which a subsequent response message 48 is received therefrom at step 50. As illustrated and described in greater detail infra, the subsequent request message 44 may include a record identifier and a record count identifier specifying the desired number of data records, as well as an optional direction identifier to identify whether the requested data is before or after the record identifier. In addition, the subsequent response message 48 may include a data component, including one or more desired data records, as well as an optional error component. Thereafter at step 52, the data received in the subsequent response message 48 is rendered according to the presentation schema from the origin response message 40.

Also in FIGS. 2A and 2B, the method 32 for providing data from a data source to a data consumer begins at step 60 wherein an initial or first request message (e.g., message 36, including an origin record identifier and a record count identifier) is received. Thereafter, an initial or first response message (e.g., message 40) is constructed at step 62 having a schema and data from a data source (e.g., data source 4 of FIG. 1). The particular data and the amount thereof included in the origin response message 40 may be determined according to the origin record identifier and the record count identifier in the first request message 36 received at step 60.

The origin response message 40 is then sent at step 64 (e.g., back to the data consumer 6), after which subsequent request messages (e.g., 44) may be received at step 66 of FIG. 2B. Subsequent response messages (e.g., 48) may be constructed thereafter at step 68 and sent to the data consumer at step 70. Although the exemplary methods 30 and 32 may be implemented by a data consumer 6 and a data provider 8, respectively, it will be recognized however, that the methods 30 and 32 may be implemented in systems other than those illustrated herein, which implementations are contemplated as falling within the scope of the present invention.

The method 30 illustrated in FIGS. 2A-2B therefore allows a system component (e.g. data consumer 6 of FIG. 1) to obtain and render dynamically changing data from a data source, by creating a presentation language representation of the data using formatting information provided dynamically by the data provider. For example, the data consumer 6 may display the data according to this presentation schema information by creating a data representation 18 in HTML, DHTML, postscript, java script, visual basic script, visual C++, and the like.

In addition, the method 30 allows requested data to be received and used by a data consumer in manageable chunks or pages of a specified size where, for example, the size of the data source is unknown, very large, or dynamically changing. For example, the data source (e.g., source 4 of FIG. 1) may be a database of system performance information which is continuously or periodically updated with new data records.

Figure 3:
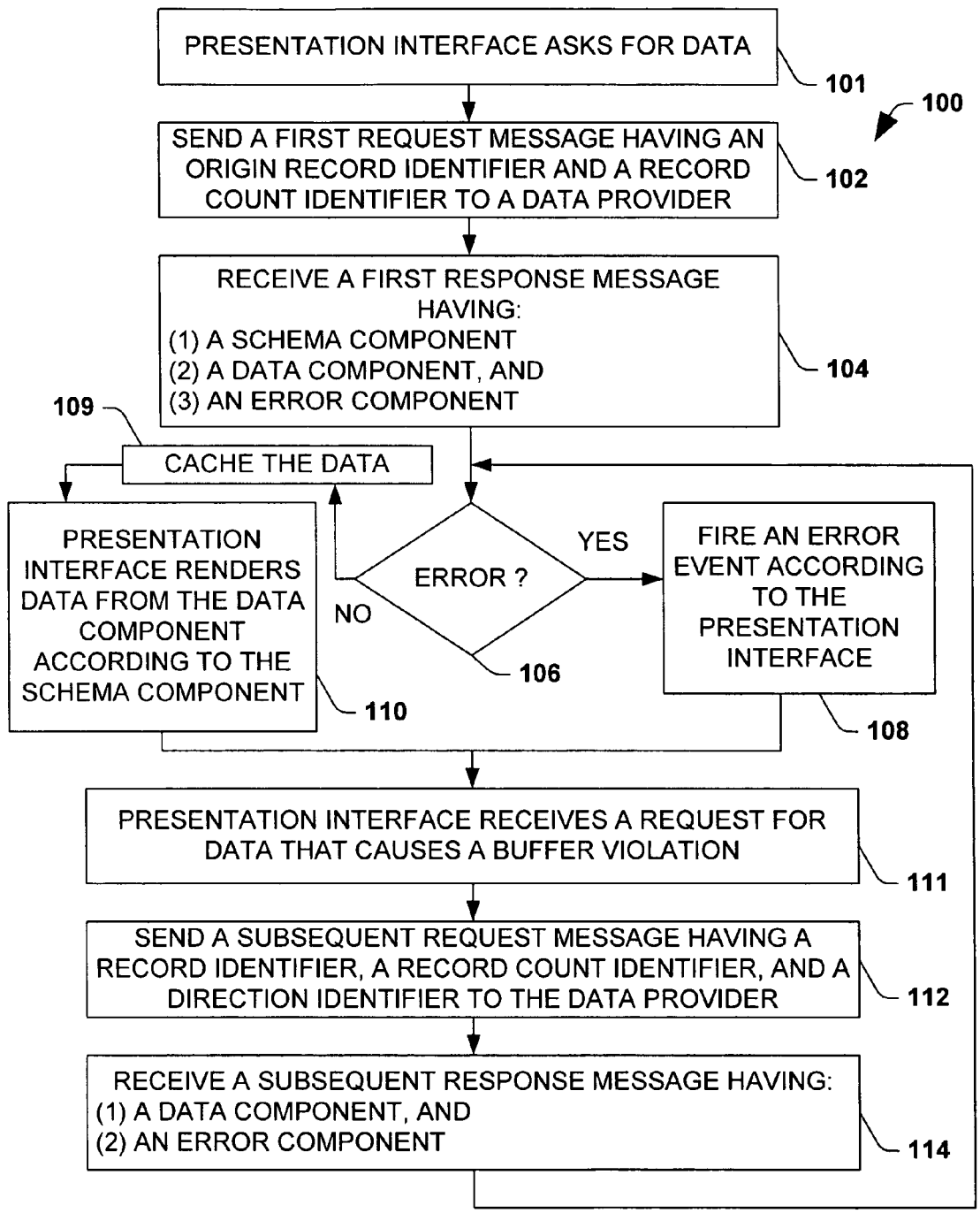
FIG. 3 is a schematic flow diagram illustrating another exemplary method of obtaining data from a data provider and transporting the data to an interface in accordance with the invention.

Referring now to FIG. 3, another exemplary method 100 for rendering data from a data provider to an interface is illustrated in accordance with the invention. Beginning at step 101, a presentation interface (e.g., interface 10 of FIG. 1) asks for data. At step 102, a first or origin request message having an origin record identifier and a record count identifier is sent to a data provider. An origin request may denote a request for the origin of the data or the starting point of the data (e.g., the top of the data). The origin record identifier may be used to indicate the desired data or a reference data record with respect to which the desired data may be indexed. In addition, wherein the data consumer has no reference record number to work with, the origin record identifier may be, for example, −1. The data provider may be adapted to interpret the origin record identifier, and to reply with a first or origin response message having a presentation schema, to be used for rendering the data supplied in the first and/or subsequent response messages.

The record count identifier may indicate the amount of data the data consumer desires to receive. For example, in requesting data from a database of computer network performance measures, an origin record may be the CPU utilization for a specific server at a specific time (e.g., midnight EST). The data consumer may desire to obtain 10 data records corresponding to the CPU utilization data for the server after midnight. Thus, the record count identifier may include an integer telling the data provider to obtain and send 10 data records from the data source in a response message, and may further indicate the relative positioning between the desired data records and the origin record.

Consequently, the method 100 allows a data consumer such as a performance monitor application communicating with a user interface, to send data request messages (e.g., at step 102) indicating a desired data page or chunk size and the position of the desired records with respect to an origin record (e.g., 10 records after the midnight CPU utilization data record). In this regard, it will be appreciated that such a data consumer may initiate such a request, for example, when a user attempts to scroll up or down a displayed data list in the interface (e.g., using a scroll bar, up/down arrow keys, page up or page down keys, and the like). In addition, subsequent request messages may optionally include a direction identifier to indicate whether the requested data is before or after data previously obtained. The method 100 thus achieves data chunking capabilities providing improved data display where, for example, large data sources and/or databases are accessed.

After the first data request message is sent at step 102, a first or origin response message is received (e.g., from the data provider) at step 104, having a schema component, a data component, and an error component. At decision step 106, the data consumer determines whether an error condition exists according to the first response message. If so, the data consumer may create an error event according to an error component of the first response message at step 108. This may include rendering error information from the error component to the interface to provide the user with useful information related to the error condition.

If no error condition exists, data from the data component of the first or origin response message may be cached at step 109, and then rendered (e.g., to an interface) according to the schema component at step 110. The schema component of the origin response message may include metadata for elements in the data component (e.g., presentation schema information related to the data in the data component). For example, the schema component may include a name component comprising an XML element tag name, a title component comprising a localized element title, a width component comprising a DHTML width string (e.g., 100px, 100%), an alignment component comprising a DHTML alignment string (e.g., left or right), a display component comprising a binary display value indicating whether an element should be displayed or hidden, and a type component comprising a binary type value which may be used to indicate whether an element is an image or other type element (e.g., HTML).

In this manner, the first response message received at step 104 includes schema component information, which may be used at step 110 as format information for presentation of data received in the data component. In rendering the data, the data consumer may create a presentation language representation (e.g., HTML, DHTML, postscript, java script, visual basic script, visual C++, and the like) according to format or presentation schema information in the schema component of the first response message. In addition, the data provided in the data component of the first response message may further include a number of data records related to the origin record identifier sent in the first request message at step 102. In this way, small or manageable portions (e.g., chunks) of data records from a data source of unknown or changing length may be provided to the data consumer. Consequently, such data chunks may be rendered at step 110 without forcing a user to wait for downloading of all the contents of large data source files or databases.

Continuing at step 111, a presentation interface may receive a request for data that causes a buffer violation. For example, the interface (e.g., interface 10 of FIG. 1) may include a memory or other data buffer. A user may initiate a request for data beyond that currently available in such a buffer, for example, by attempting to scroll down a display. Accordingly, at step 112, a subsequent request message may be sent from the data consumer to the data provider having a record identifier, a record count identifier, and an optional direction identifier.

The direction identifier may optionally be included in such subsequent a request message, for example, to indicate whether the requested data is before or after the record identifier. Such a direction identifier may be used by the data provider in obtaining the desired data records from the data source. Thereafter, a subsequent response message is received at step 114 including a data component, and an optional error component as described supra. If no error condition exists at step 106, the data received in the subsequent response message at step 114 is rendered according to the schema component received in the first response message at step 104. It will be recognized that the method 100 allows a data provider to provide a presentation schema or other format information (e.g., via the schema component of the first response message) to the data consumer, which is then used by a data consumer in rendering the data to an interface.

The methodology of steps 106-114 may then be repeated any number of times, according to the amount of data a data consumer may desire from a particular data source. For example, the method 100 may be used to obtain one or more chunks or pages of desired information or data from a data source, where such data is displayed to a user in an interface display (e.g., display 20 of interface 10). The data consumer may initiate such data requests, for example, in response to the user scrolling down a data display window or grid, using a scroll bar, down arrow key, page down key, and the like. Furthermore, such request messages may be initiated by a user attempting to scroll up such a grid, for example, using a scroll bar, up arrow key, page up key, and the like. Moreover, it will be recognized that subsequent origin request messages may be sent by the data consumer in order to re-acquire the schema component from the data provider.

In addition, data obtained in this fashion may be buffered by the data consumer (e.g., via a cache memory), such that when a user attempts to scroll the display to view previously received data, the data may be rendered from the cache rather than requesting the data from the data provider. In this regard, the buffering or cache may advantageously reside in the presentation interface, such as in display memory. The record identifier and the record count identifier of the request messages sent at steps 102 and/or 112 may be advantageously employed to indicate to the data provider the position of the desired pages of data records with respect the record identifier in a data source being consulted. In addition, a direction identifier may be employed to indicate, for example, whether the data requested is before or after the record identifier.

Figure 4:
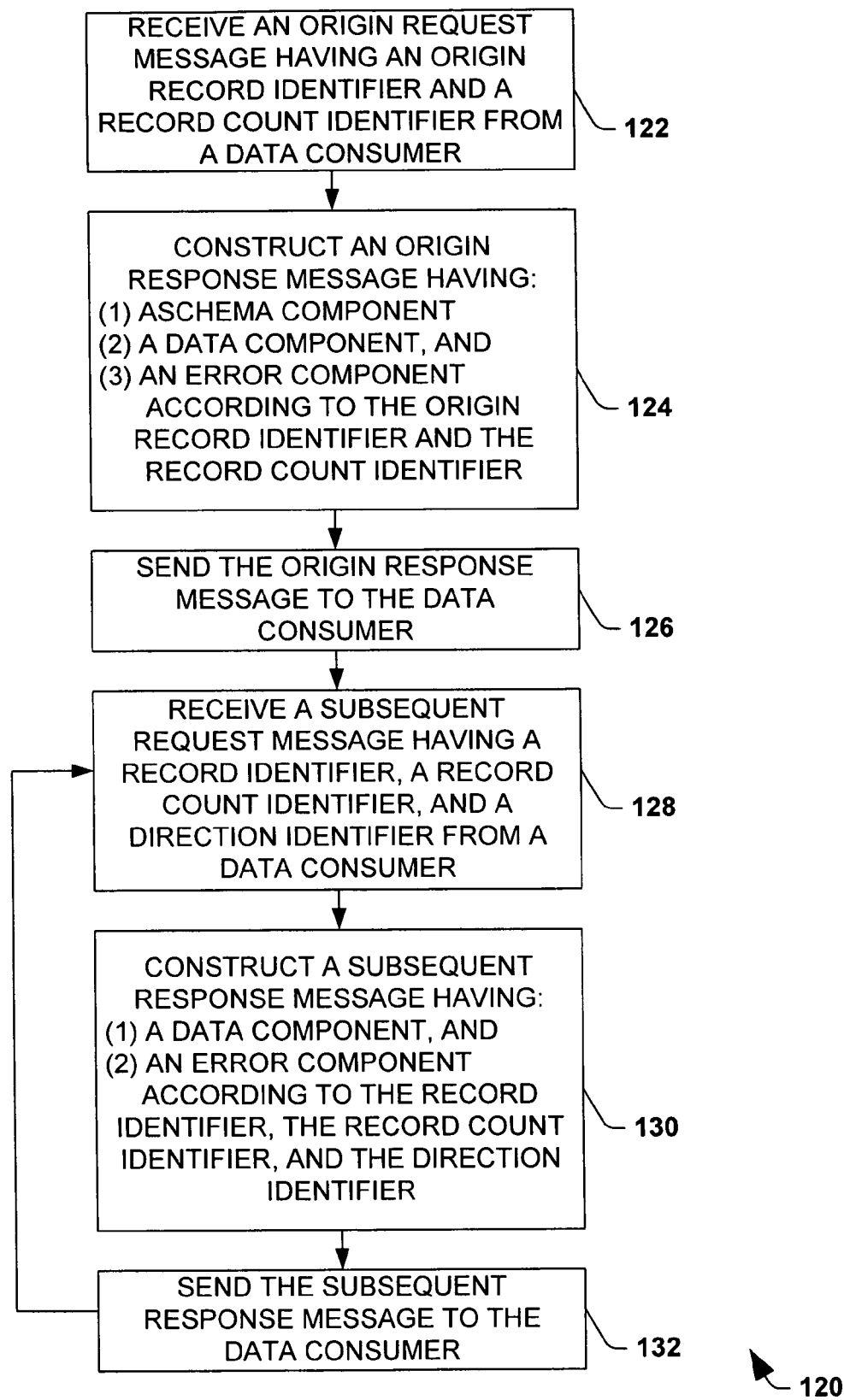
FIG. 4 is a schematic flow diagram illustrating another exemplary method of providing data from a data source to a data consumer in accordance with the invention.

Referring now to FIG. 4, another exemplary method 120 for providing data from a data source to a data consumer is illustrated in accordance with the invention. The method 120 may be implemented, for example, in a data provider (e.g., data provider 8 of FIG. 1). A first request message is received at step 122 from a data consumer. The first or origin request message (as discussed in greater detail infra with respect to FIG. 5A) may comprise an origin record identifier and a record count identifier. At step 124, a first or origin response message is created (e.g., by the data provider) having a schema component, a data component, and an optional error component.

The first or origin response message is constructed at step 124 according to the record identifier and the record count identifier received in the first or origin request message at step 122. In this regard, the origin record identifier and record count identifier may be used to determine which chunk or page of data records from the data source database are to be sent to the data consumer in a response message. As described in greater detail infra, the schema component of the response message may comprise a presentation schema (e.g., formatting information) related to data elements in the data component of the response message. In addition, the optional error component may include error information relating to specific error conditions existing in the data source. For example, an error may occur during construction of a response message at step 124 during a database query or search for desired data records in the data source.

Constructing the first response message at step 124 may comprise, for example, constructing a query string (not shown) according to the origin record identifier and the record count identifier received in the request message at step 122, and performing a query of the data source according to the query string. Step 124 may further include obtaining a result set (not shown) from the data source according to the query, and constructing the first response message according to the result set. Accordingly, where a data source query or search successfully provides the desired data records, the schema component may be constructed having formatting information related to the data elements (e.g., fields) in the data records of the result set, and the data component may be constructed with the data records obtained from the result set.

If, however, an error occurred during the data source query, an empty data component may be constructed at step 124 and the error component may be constructed to include error information providing the data consumer with meaningful information related to the error. Furthermore, empty data components may be constructed, for example, where an end of file or beginning of file condition is encountered during the data source query. In addition, construction of the data component at step 124 may comprise providing an integer number of data records therein according to the record count identifier provided with the first or origin request message received at step 122.

Once the first or origin response message is constructed at step 124, the message is sent to the data consumer at step 126. Thereafter a subsequent request message may be received at step 128 having a record identifier and a record count identifier from a data consumer. In this regard, it will be appreciated that the record identifier and the record count identifier may be employed to indicate which data records are desired with respect to the most recently acquired data records, or with respect to an origin or first data record. In addition, an optional direction identifier may be included in the subsequent request message, for example, to indicate whether the desired data records are before or after those previously obtained. A subsequent response message is then constructed at step 130 comprising a data component and an optional error component, in accordance with the record identifier and record count identifier (and/or the optional direction identifier) received in the subsequent request message at step 128.

It will be appreciated that other forms of subsequent response messages are possible within the scope of the invention. For example, a second response message may be constructed having a schema component as well as a data component and an error component. Where the data consumer has previously received a schema component, such as in a first response message sent in step 126, the formatting information contained in this schema component may be used subsequently to display further pages or chunks of data received in subsequent response messages constructed at step 130 in accordance with another aspect of the invention. However, the invention contemplates the data consumer sending further origin record identifiers, in response to which the data provider may again send a response message having a schema component.

Furthermore, the data provider may be adapted to send an unsolicited response message having a schema component therein, for example, where the data source format has changed, to provide the data consumer with the latest formatting information relating to the data being provided by the data provider. Thus, the data provider may selectively include a schema component in constructing response messages when a change in the formatting of the data record is required, and not include such formatting information (e.g., schema component) when the formatting remains the same, in accordance with another aspect of the invention.

Once a second or subsequent response message has been constructed according to the record identifier and record count identifier at step 130, the subsequent response message is sent to the data consumer at step 132. Thereafter, the methodology of steps 128, 130, and 132 may be repeated, whereby desired chunks or portions of data from a database may be provided from a data source to a data consumer in accordance with request messages received therefrom.

Figure 5A:
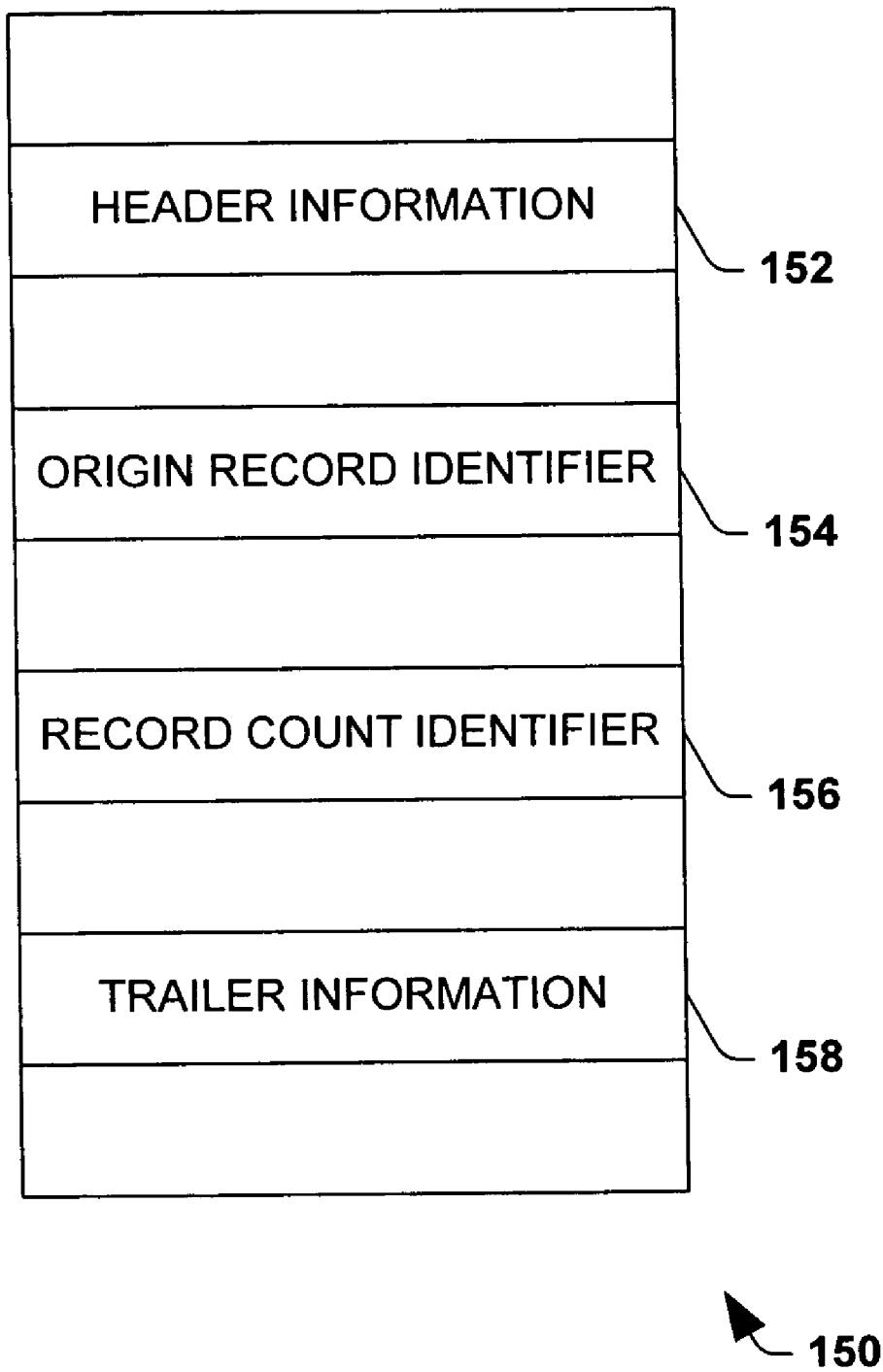
FIG. 5A is a schematic diagram illustrating an exemplary first request message in accordance with another aspect of the invention.
Figure 5B:
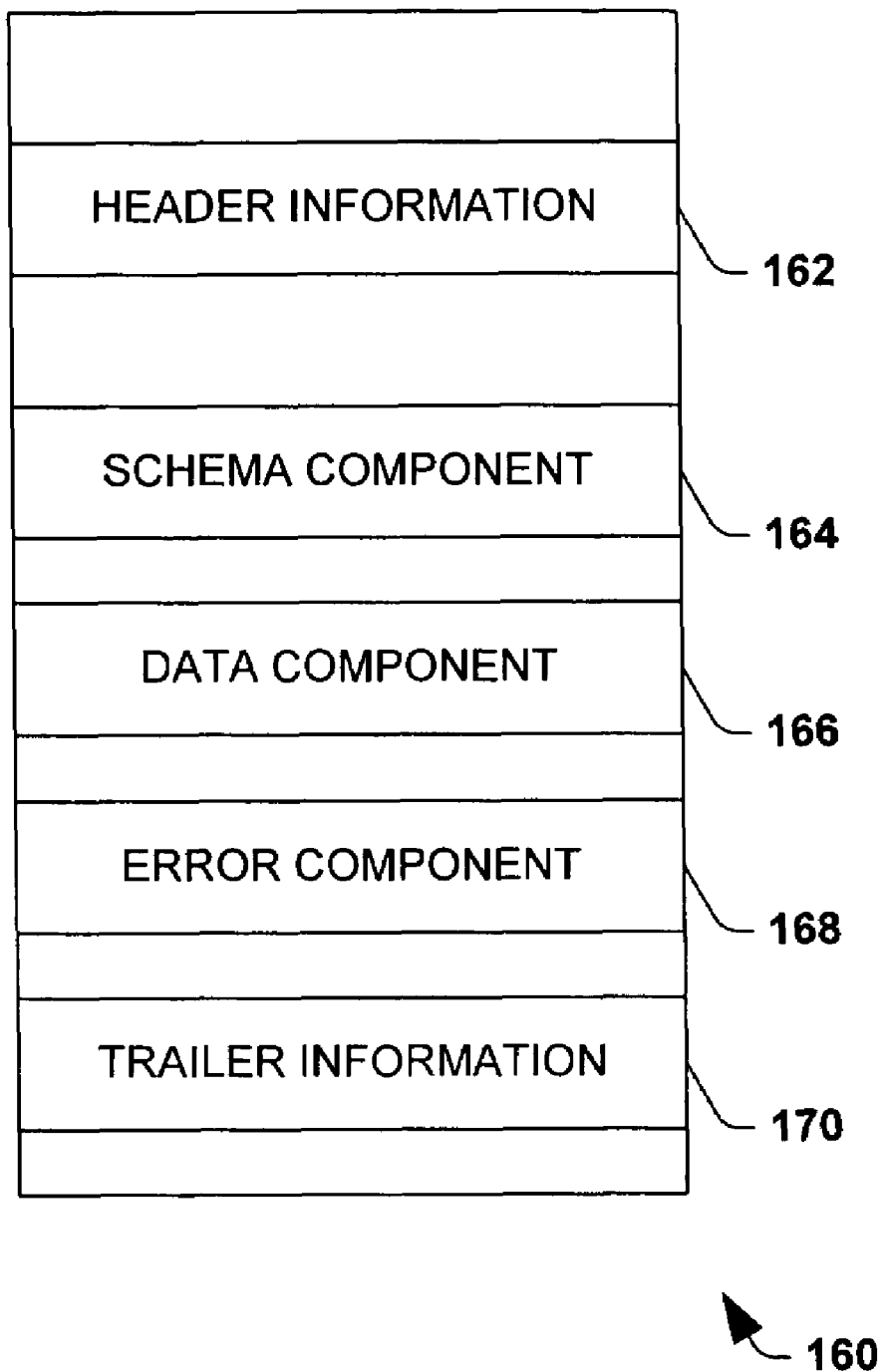
FIG. 5B is a schematic diagram illustrating an exemplary first response message in accordance with the invention.

Referring now to FIGS. 5A and 5B, an exemplary first or origin request message 150 is illustrated having header information 152, an origin record identifier 154, a record count identifier 156, and trailer information 158. In accordance with the methodologies illustrated and described supra, the origin record identifier 154 may comprise a record identifier used in a data source query or search as the starting point of a page or chunk of data records desired by a data consumer. However, when a desired record is unknown to a data consumer, such as when a user first accesses or requests data from a data source, the origin record identifier 154 may, for example, be −1 or some other number indicating to the data provider that a schema component (e.g. presentation schema) is to be provided to the data consumer.

The record count identifier 156 may comprise an integer. This integer may be used by a data provider to determine the maximum number of records to be returned in the data component of a response message. This allows chunking, whereby a data consumer may be provided with manageable pages or chunks of data records from a data source, without forcing such a data consumer to wait for an entire file to be downloaded, which may sometimes be lengthy. In this way, a subset of the data in a data source may be obtained in a controlled fashion. The header information 152 and/or trailer information 158 may be used for one or more administrative purposes, such as message routing, and the like, to insure that messages are properly exchanged between a data provider and a data consumer.

Referring also to FIG. 5B, an exemplary origin or first response message 160 is illustrated having header information 162, a schema component 164, a data component 166, an optional error component 168, and trailer information 170. As discussed supra, the schema component 164 may comprise formatting information or metadata associated with elements or fields of data records included within the data component 166 (e.g., a presentation schema). For example, the schema component 164 may comprise a name component including an XML element tag name, a title component including a localized element title, and a width component including a DHTML width string. Component 164 may further include an alignment component with a DHTML alignment string, a display component with a binary display value indicating whether a particular data element or field is to be displayed or hidden, and a type component including a binary type value indicating whether a data element or field is to be displayed as an image or as HTML.

The data component 166 may comprise a number of data records from the data source, wherein the number of records in the data component 166 may be determined based on the record count identifier provided in a request message (e.g., message 150 of FIG. 5A). In addition, data records in the data component 166 may advantageously be provided in the same order as the corresponding schema information in the schema component 164. An empty data component 166 may be provided in the message 160, for example, where a record count of zero was provided in a request message, where an error condition exists, and/or where an end of file or beginning of file was encountered during a data source query. As described supra, the error component 168 may selectively be provided with error information related to any error conditions existing. The header information 162 and the trailer information 170 may include information required for proper message routing, etc.

Figure 5C:
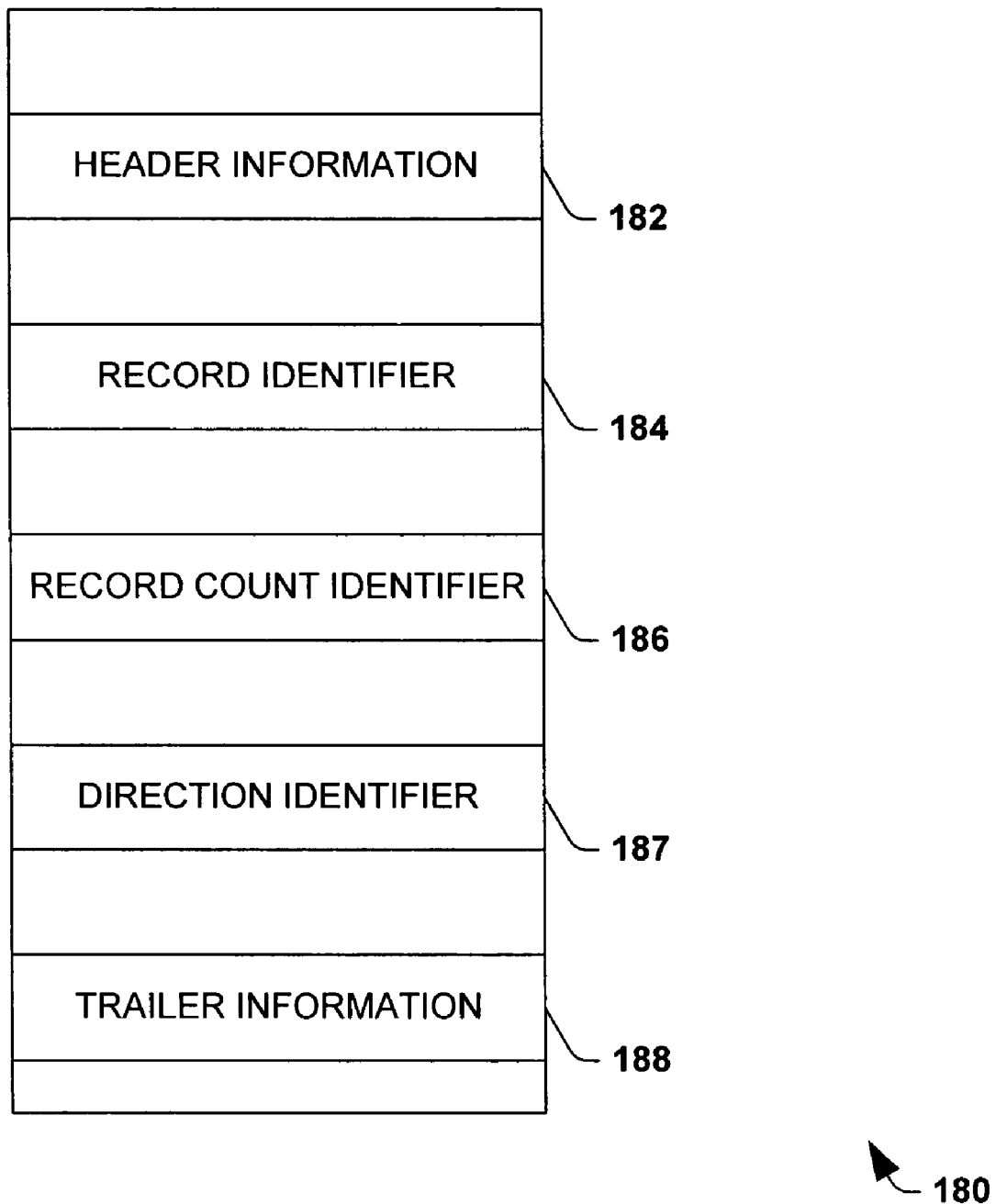
FIG. 5C is a schematic diagram illustrating an exemplary subsequent request message in accordance with another aspect of the invention.

In FIG. 5C, an exemplary subsequent request message 180 is illustrated having header information 182, a record identifier 184, a record count identifier 186, a direction identifier 187, and trailer information 188. The record identifier 184 may be used in a data source query or search as the starting point of a page or chunk of data records desired by a data consumer. For example, the record identifier 184 may be the exclusive starting point in a data source file.

Figure 5D:
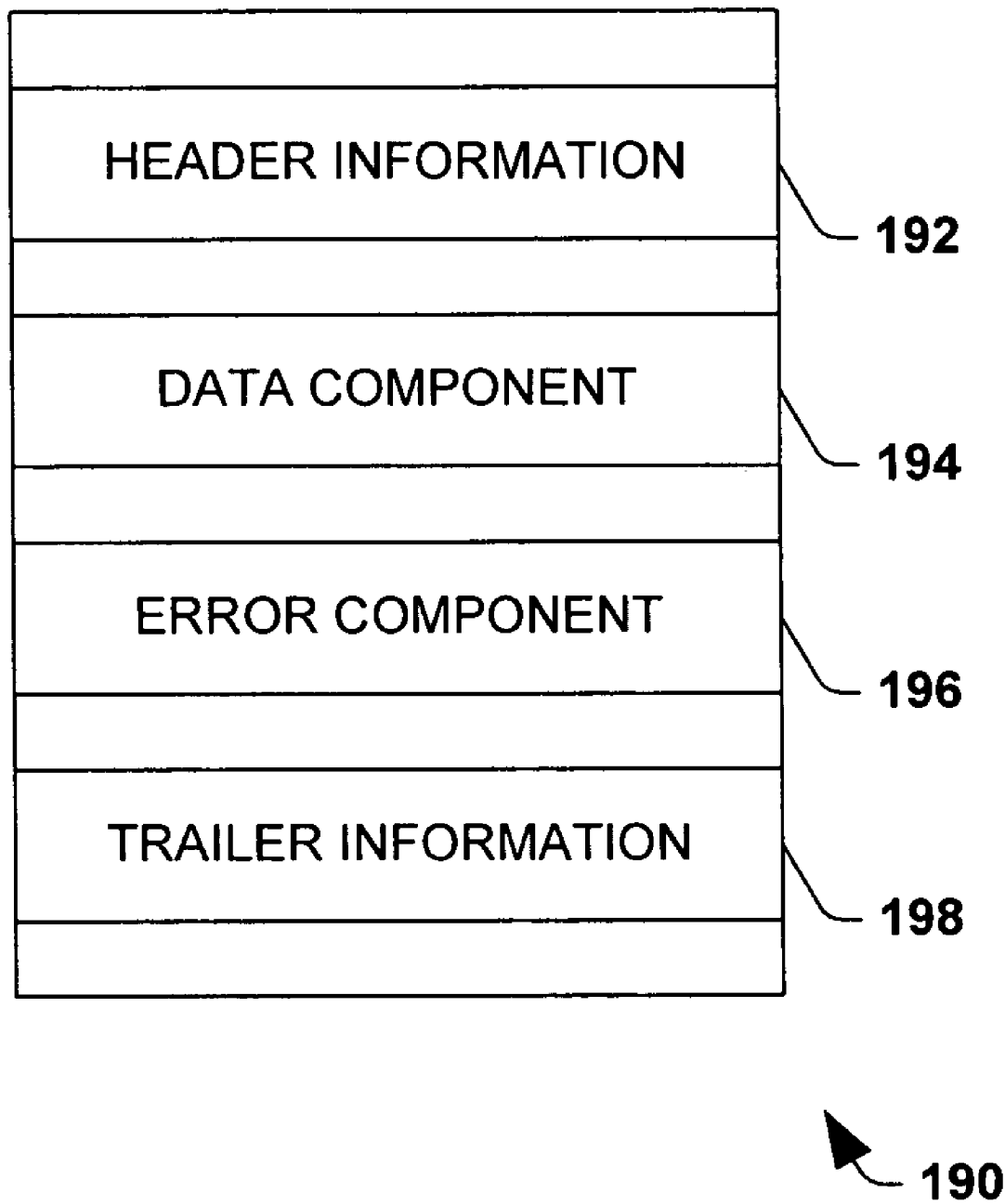
FIG. 5D is a schematic diagram illustrating an exemplary subsequent response message in accordance with the invention.

The record count identifier 186 may comprise an integer, for use by the data provider in determining the maximum number of records to be returned in the data component of a subsequent response message (e.g., message 190 of FIG. 5D, as described supra). This allows chunking, whereby the data consumer may be provided with manageable pages or chunks of data records from a data source. In addition, the subsequent request message 180 may optionally include the direction indicator 187, for example, to indicate whether the requested data records are before or after the record identifier, or to otherwise indicate the relative position of the desired data records with respect to an origin record, the most recently requested data records, or some other reference. The direction identifier 187 may be adapted, for example, to specify the direction of request relative to the record identifier, and need not be provided in origin request message 150.

Such a direction identifier 187 in subsequent request messages (e.g., message 180) provides the ability of the technology to abstract or otherwise make the record identifier 184 agnostic, such that a record identifier 184 of any format may be used without any work on the part of a consumer of the technology. In this regard, the direction identifier 187 need not be parsed, but instead may be handled as a black box when sent to the data provider (e.g., data provider 8 of FIG. 1) in subsequent request messages (e.g., message 180). This allows the technology implementing the invention to safely iterate a virtual or non-deterministic data source wherein, for example, the number of data records therein is continuously or periodically increasing (e.g., computer system performance monitor application databases, and the like). The header information 182 and/or trailer information 188 may be used for one or more administrative purposes, such as message routing, and the like, to insure that messages are properly exchanged between a data source and a data consumer.

FIG. 5D illustrates an exemplary subsequent response message 190 (e.g. from a data provider to a data consumer) in accordance with another aspect of the invention. The message 190 includes header information 192, a data component 194 having data records obtained by the data provider from the data source, an optional error component 196, and trailer information 198. The data component 194 may comprise a number of data records from the data source, wherein the number of records in the data component 194 may be determined based on the record count identifier (e.g., 186) provided in a request message (e.g., message 180 of FIG. 5C).

In addition, data records in the data component 194 may advantageously be provided in the same order as the corresponding schema information in the schema component 164 of the first response message 160. An empty data component 194 may be provided in the message 190 where a record count of zero was provided in a request message 180, where an error condition exists, and/or where an end of file or beginning of file was encountered during a data source query. As described supra, the error component 196 may selectively be provided with error information related to any error conditions existing. The header information 192 and the trailer information 198 may include information required for proper message routing, etc.

Figure 6A:
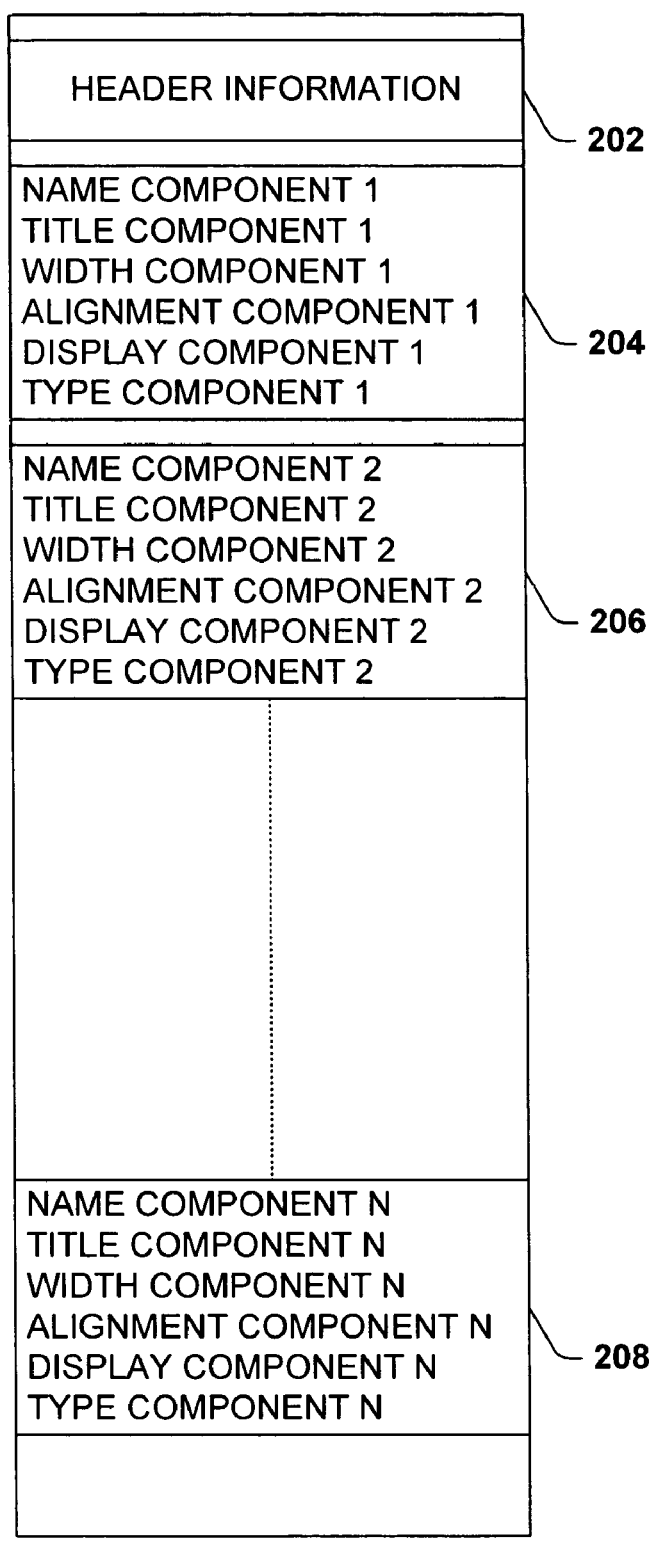
FIG. 6A is a schematic diagram illustrating another exemplary first response message in accordance with another aspect of the invention.
Figure 6B:
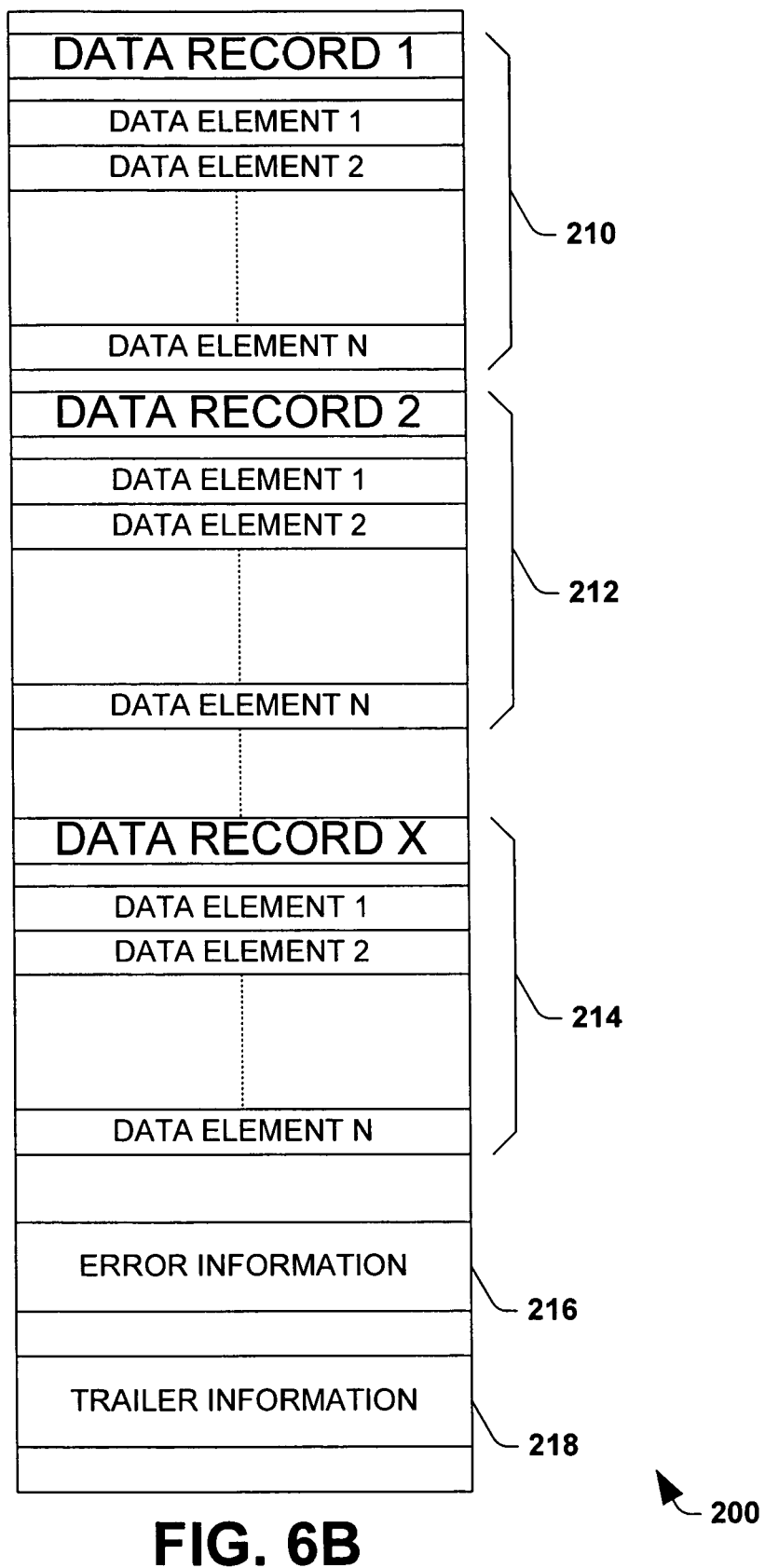
FIG. 6B is a schematic diagram further illustrating the response message of FIG. 6A.

Referring to FIGS. 6A and 6B, another exemplary response message 200 is illustrated having header information 202, a schema component comprising element types 204, 206, and 208, a data component including data records 210, 212 and 214, an error component 216 comprising error information, and trailer information 218. As illustrated in FIG. 6A, it will be noted that an element type (e.g., 204, 206 and/or 208) may be included within the response message 200, wherein each such schema may correspond with a field or data element of the data records 210, 212 and 214.

Each element type (e.g., 202, 204, and/or 206), moreover, may comprise a name component, a title component, a width component, an alignment component, a display component, and a type component. For example, an integer number N of data elements may exist in each data record 210, 212, and 214 to be provided in the data component of a response message. Accordingly, an integer number N element types (e.g., 204, 206 and 208) are provided in the schema component of the response message 200. Subsequent response messages may be provided which do not include the element types 204, 206, and 208, as discussed supra, whereby the data consumer may render the data records (e.g., records 210, 212, and 214) in the data component according to a previously received schema component.

Referring to FIG. 6B, each data record 210, 212 and 214, in message 200 may include an integer number N data elements. In this regard, an integer number X of such data records 210, 212 and 214 may be provided in the message 200 in accordance with the record count identifier of a corresponding request message from the data consumer. The error component 216 may include error information selectively provided according to any error condition which may exist.

Figure 7A:
FIG. 7A is an illustration of an exemplary schema for a response message in accordance with the invention using XML.
Figure 7B:
FIG. 7B is an illustration of an exemplary data set collection definition for a response message in accordance with the invention.
Figure 7C:
FIG. 7C is an illustration of an exemplary element type definition in XML for a response message in accordance with the invention.

In FIG. 7A, an exemplary schema 300 is illustrated for a response message using XML in accordance with the invention. The schema 300 includes a schema component, a data component, and an error component (not numerically designated). FIG. 7B illustrates an exemplary data set collection definition 302 for a response message. In FIG. 7C, an exemplary element type definition 304 is illustrated in XML for a response message. As discussed supra, the exemplary element definition 304 may comprise a name component, a title component, a width component, an alignment component, a display component, and a type component (not numerically designated).

The exemplary schema 300 of FIG. 7A may also comprise the exemplary data collection 306 of FIG. 7D in accordance with the invention. In FIG. 7E, an exemplary record definition 308 in XML is illustrated for a response message. FIG. 7F illustrates an exemplary error collection 310 in XML for a response message. The error collection 310 may comprise, for example, a number element and a description element (not numerically designated), such that when an error occurs the number and description may be provide to a data consumer for rendering to the user via an interface.

In FIG. 8A, an exemplary XML origin response message 350 is illustrated. In accordance with the exemplary XML response message schema 300 of FIG. 7A and the methods and systems described and illustrated supra, the origin response message 350 comprises a schema component 352, a data component 354, and an error component 356. Another exemplary XML origin response message 360 is illustrated in FIG. 8B in accordance with the invention. In accordance with schema 300, the origin response message 360 comprises a schema component 362, a data component 364, and an error component 366.

In accordance with another aspect of the invention, a data provider may reside in a computer system application. The following is an exemplary implementation of an aspect of the invention, which may be employed in a computer system data provider:

```
<RECORDSET>
  <SCHEMA>
    <ELEMENT_TYPE>
      <NAME>ID</NAME>
      <TITLE>Record Id</TITLE>
      <WIDTH>80px</WIDTH>
      <ALIGN>right</ALIGN>
      <DISPLAY>1</DISPLAY>
      <TYPE>0</TYPE>
    </ELEMENT_TYPE>
    <ELEMENT_TYPE>
      <NAME>NODE_TYPE</NAME>
      <TITLE>Node Type</TITLE>
      <WIDTH>80px</WIDTH>
      <ALIGN>right</ALIGN>
      <DISPLAY>1</DISPLAY>
      <TYPE>0</TYPE>
    </ELEMENT_TYPE>
    <ELEMENT_TYPE>
      <NAME>FilePath</NAME>
      <TITLE>File Path</TITLE>
      <WIDTH>100%</WIDTH>
      <ALIGN>left</ALIGN>
      <DISPLAY>1</DISPLAY>
      <TYPE>3</TYPE>
    </ELEMENT_TYPE>
  </SCHEMA>
  <RECORDS>
    <RECORD>
      <ID>10001</ID>
      <NODE_TYPE>0</NODE_TYPE>
      <FilePath><![CDATA[<input type='checkbox'/>c:\Record 01.txt]]></FilePath>
    </RECORD>
    <RECORD>
      <ID>10002</ID>
      <NODE_TYPE>1</NODE_TYPE>
      <FilePath><![CDATA[<input type='checkbox'/>c:\Record 01.txt]]></FilePath>
    </RECORD>
    <RECORD>
      <ID>10003</ID>
      <NODE_TYPE>0</NODE_TYPE>
      <FilePath><![CDATA[<input type='checkbox'/>c:\Record 01.txt]]></FilePath>
    </RECORD>
    <RECORD>
      <ID>10004</ID>
      <NODE_TYPE>1</NODE_TYPE>
      <FilePath><![CDATA[<input type='checkbox'/>c:\Record 01.txt]]></FilePath>
    </RECORD>
    <RECORD>
      <ID>10005</ID>
      <NODE_TYPE>0</NODE_TYPE>
      <FilePath><![CDATA[<input type='checkbox'/>c:\Record 01.txt]]></FilePath>
    </RECORD>
    <RECORD>
      <ID>10006</ID>
      <NODE_TYPE>1</NODE_TYPE>
      <FilePath><![CDATA[<input type='checkbox'/>c:\Record 01.txt]]></FilePath>
    </RECORD>
    <RECORD>
      <ID>10007</ID>
      <NODE_TYPE>0</NODE_TYPE>
      <FilePath><![CDATA[<input type='checkbox'/>c:\Record 01.txt]]></FilePath>
    </RECORD>
    <RECORD>
      <ID>10008</ID>
      <NODE_TYPE>0</NODE_TYPE>
      <FilePath><![CDATA[<input type='checkbox'/>c:\Record 01.txt]]></FilePath>
    </RECORD>
    <RECORD>
      <ID>10009</ID>
      <NODE_TYPE>1</NODE_TYPE>
      <FilePath><![CDATA[<input type='checkbox'/>c:\Record 01.txt]]></FilePath>
    </RECORD>
    <RECORD>
      <ID>10010</ID>
      <NODE_TYPE>0</NODE_TYPE>
      <FilePath><![CDATA[<input type='checkbox'/>c:\Record 01.txt]]></FilePath>
    </RECORD>
```

-continued

```
<RECORD>
    <ID>10011</ID>
    <NODE_TYPE>1</NODE_TYPE>
    <FilePath><![CDATA[<input type='checkbox'/>c:\Record 01.txt]]></FilePath>
</RECORD>
<RECORD>
    <ID>10012</ID>
    <NODE_TYPE>0</NODE_TYPE>
    <FilePath><![CDATA[<input type='checkbox'/>c:\Record 01.txt]]></FilePath>
</RECORD>
<RECORD>
    <ID>10013</ID>
    <NODE_TYPE>1</NODE_TYPE>
    <FilePath><![CDATA[<input type='checkbox'/>c:\Record 01.txt]]></FilePath>
</RECORD>
<RECORD>
    <ID>10014</ID>
    <NODE_TYPE>0</NODE_TYPE>
    <FilePath><![CDATA[<input type='checkbox'/>c:\Record 01.txt]]></FilePath>
</RECORD>
<RECORD>
    <ID>10015</ID>
    <NODE_TYPE>1</NODE_TYPE>
    <FilePath><![CDATA[<input type='checkbox'/>c:\Record 01.txt]]></FilePath>
</RECORD>
<RECORD>
    <ID>10016</ID>
    <NODE_TYPE>0</NODE_TYPE>
    <FilePath><![CDATA[<input type='checkbox'/>c:\Record 01.txt]]></FilePath>
</RECORD>
<RECORD>
    <ID>10017</ID>
    <NODE_TYPE>1</NODE_TYPE>
    <FilePath><![CDATA[<input type='checkbox'/>c:\Record 01.txt]]></FilePath>
</RECORD>
<RECORD>
    <ID>10018</ID>
    <NODE_TYPE>0</NODE_TYPE>
    <FilePath><![CDATA[<input type='checkbox'/>c:\Record 01.txt]]></FilePath>
</RECORD>
<RECORD>
    <ID>10019</ID>
    <NODE_TYPE>1</NODE_TYPE>
    <FilePath><![CDATA[<input type='checkbox'/>c:\Record 01.txt]]></FilePath>
</RECORD>
<RECORD>
    <ID>10020</ID>
    <NODE_TYPE>0</NODE_TYPE>
    <FilePath><![CDATA[<input type='checkbox'/>c:\Record 01.txt]]></FilePath>
</RECORD>
<RECORD>
    <ID>10021</ID>
    <NODE_TYPE>1</NODE_TYPE>
    <FilePath><![CDATA[<input type='checkbox'/>c:\Record 01.txt]]></FilePath>
</RECORD>
<RECORD>
    <ID>10022</ID>
    <NODE_TYPE>0</NODE_TYPE>
    <FilePath><![CDATA[<input type='checkbox'/>c:\Record 01.txt]]></FilePath>
</RECORD>
<RECORD>
    <ID>10023</ID>
    <NODE_TYPE>0</NODE_TYPE>
    <FilePath><![CDATA[<input type='checkbox'/>c:\Record 01.txt]]></FilePath>
</RECORD>
<RECORD>
    <ID>10024</ID>
    <NODE_TYPE>1</NODE_TYPE>
    <FilePath><![CDATA[<input type='checkbox'/>c:\Record 01.txt]]></FilePath>
</RECORD>
<RECORD>
    <ID>10025</ID>
    <NODE_TYPE>0</NODE_TYPE>
    <FilePath><![CDATA[<input type='checkbox'/>c:\Record 01.txt]]></FilePath>
</RECORD>
<RECORD>
    <ID>10026</ID>
    <NODE_TYPE>1</NODE_TYPE>
```

```
        <FilePath><![CDATA[<input type='checkbox'/>c:\Record 01.txt]]></FilePath>
    </RECORD>
    <RECORD>
        <ID>10027</ID>
        <NODE_TYPE>0</NODE_TYPE>
        <FilePath><![CDATA[<input type='checkbox'/>c:\Record 01.txt]]></FilePath>
    </RECORD>
    <RECORD>
        <ID>10028</ID>
        <NODE_TYPE>1</NODE_TYPE>
        <FilePath><![CDATA[<input type='checkbox'/>c:\Record 01.txt]]></FilePath>
    </RECORD>
    <RECORD>
        <ID>10029</ID>
        <NODE_TYPE>0</NODE_TYPE>
        <FilePath><![CDATA[<input type='checkbox'/>c:\Record 01.txt]]></FilePath>
    </RECORD>
    <RECORD>
        <ID>10030</ID>
        <NODE_TYPE>1</NODE_TYPE>
        <FilePath><![CDATA[<input type='checkbox'/>c:\Record 01.txt]]></FilePath>
    </RECORD>
    <RECORDS>
    <ERROR></ERROR>
</RECORDSET>
```

Referring now to FIGS. 9A through 9E, an exemplary system 400 for rendering data from a data source 402 to an interface 404 is illustrated, having a data provider 406 and a data consumer 408, in accordance with another aspect of the invention. In this example, the data source 402 includes a beginning of file BOF, a data set having an integer number N of data records RECORD 00 through RECORD N, and an end of file EOF. The data consumer 408 includes a cache or buffer memory 410 having associated therewith a display range or window 412, which corresponds to a range of data records (not shown), which may be displayed or rendered to a user in a display 414 in the interface 404. A user may move the display range 412 up or down in the cache 410 in the direction 416, for example, using a scroll bar, up/down arrow keys, page up or page down keys, and the like, in the interface 404. The data consumer 408 may send request messages to the data provider 406 according to indications from the interface 404 that a user desires to view data records not presently available in the cache 410 for rendering to the display 414. In this regard, the cache 410 may reside in the data consumer 408 or alternatively in the display 414, for example, in display memory (not shown).

Figure 9A:
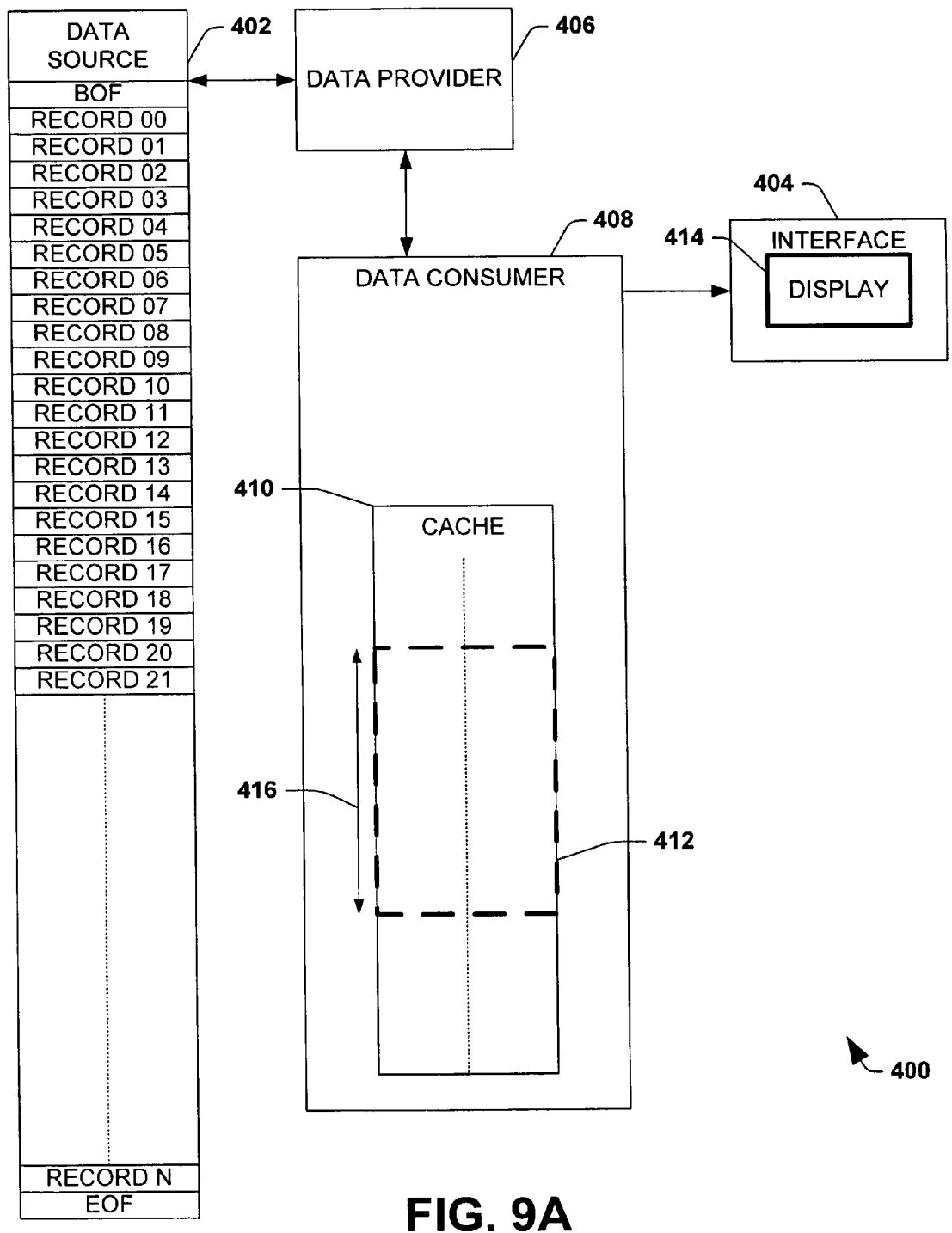
FIG. 9A is a schematic diagram illustrating an exemplary system for rendering data from a data source to an interface, having a data provider and a data consumer, in accordance with another aspect of the invention.
Figure 9B:
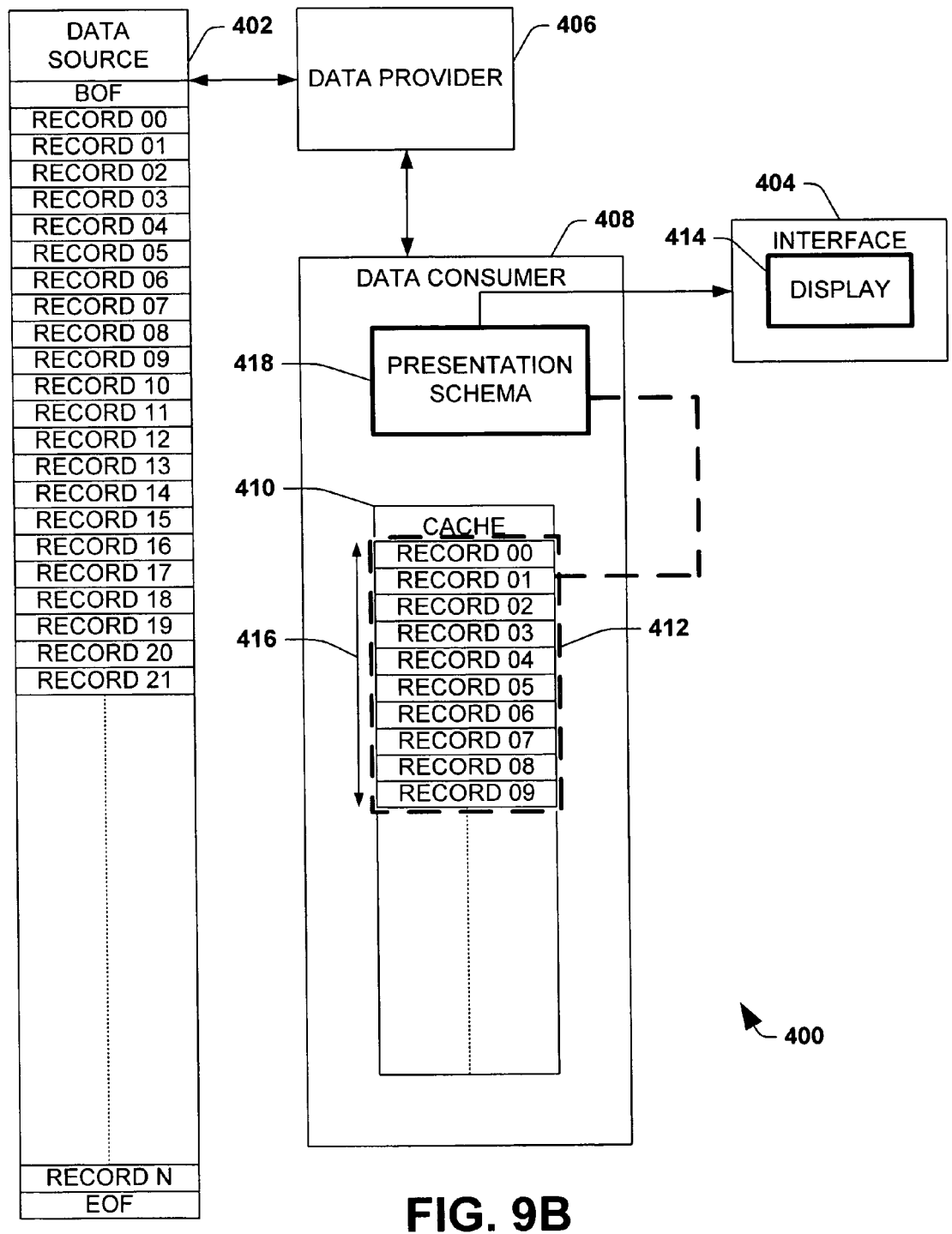
FIG. 9B is a schematic diagram further illustrating the system of FIG. 9A.

Referring also to FIG. 9B, upon receipt of an initial or first response message (e.g., message 200 of FIGS. 6A and 6B), the data consumer 408 receives a presentation schema 418 (e.g., schema component) and data records RECORD 00 through RECORD 09 from the data provider 406. For example, the origin request message (e.g., message 150 of FIG. 5A) may have included a record count identifier (e.g., identifier 156) indicating that the user desired ten data records from the data source 402, and an origin record identifier (e.g. identifier 154) indicating that a presentation schema component (e.g., schema 418) was desired or needed (e.g., origin record identifier had a value of −1). The data consumer 408 accordingly renders the data records RECORD 00 through RECORD 09 to the interface 404 in a presentation language representation (e.g., HTML, DHTML, postscript, java script, visual basic script, visual C++, and the like) for presentation in the display 414. The user may then view the ten data records in the window 412 using the display 414 of interface 404 as illustrated in FIG. 9B.

Figure 9C:
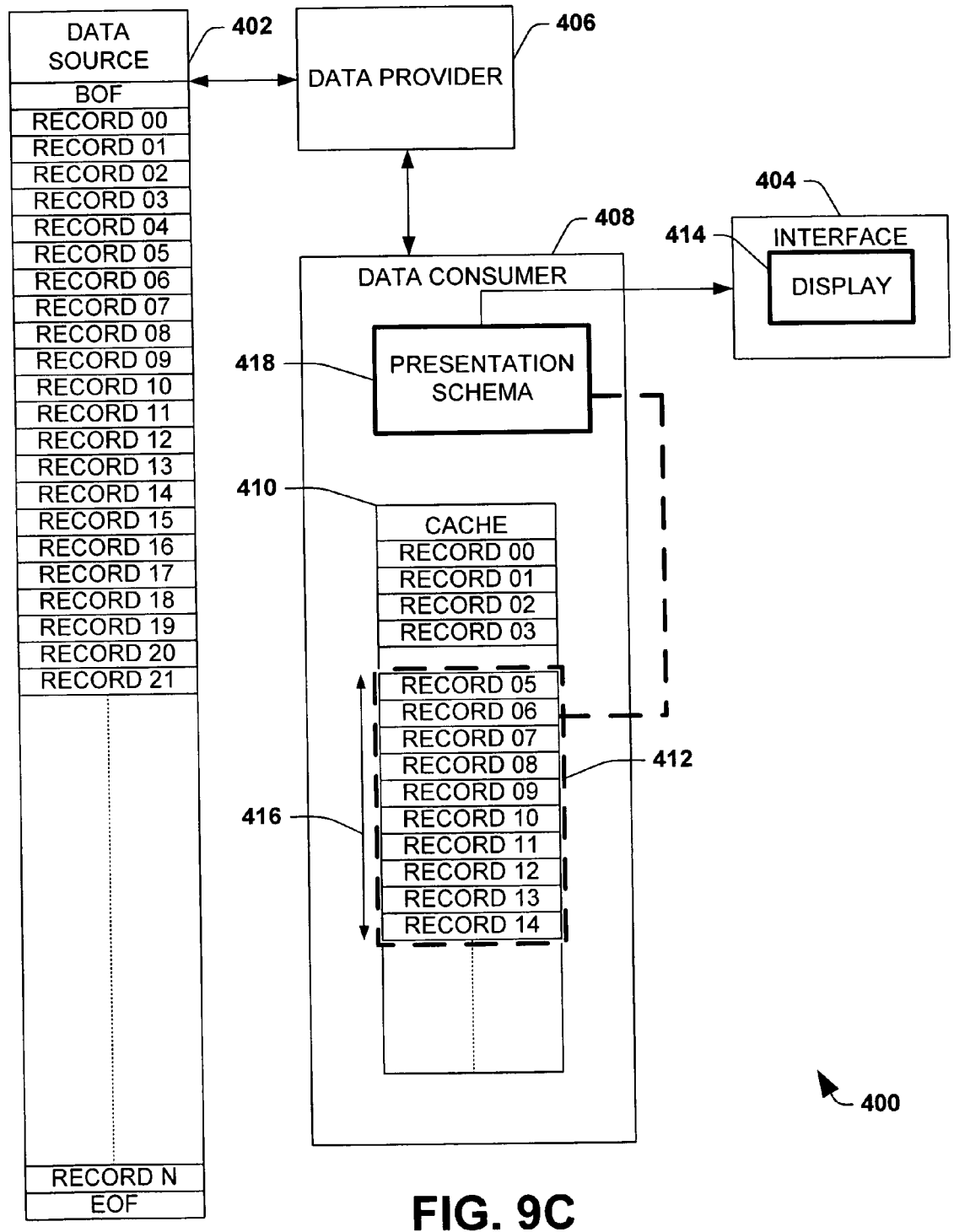
FIG. 9C is a schematic diagram further illustrating the system of FIGS. 9A-B.

Referring also to FIG. 9C, if the user attempts to scroll the window 412 down (e.g., using a scroll bar, up/down arrow keys, page up or page down keys, and the like) via the interface 414, the data consumer 408 determines that the desired data is not available in the cache 410, and accordingly sends a subsequent request message (e.g., message 180 of FIG. 5C) having a record identifier (e.g., identifier 184) and a record count identifier (e.g., 186) indicating that another 5 data records (e.g., RECORD 10 through RECORD 14) are desired. The data provider then generates a subsequent response message (e.g., message 190 of FIG. 5C) having the desired data records from the data source 412, and sends the message to the data consumer 408. Data consumer 408 then renders the additional records RECORD 10 through RECORD 14 to the interface 404 in accordance with the previously received presentation schema 418.

Figure 9D:
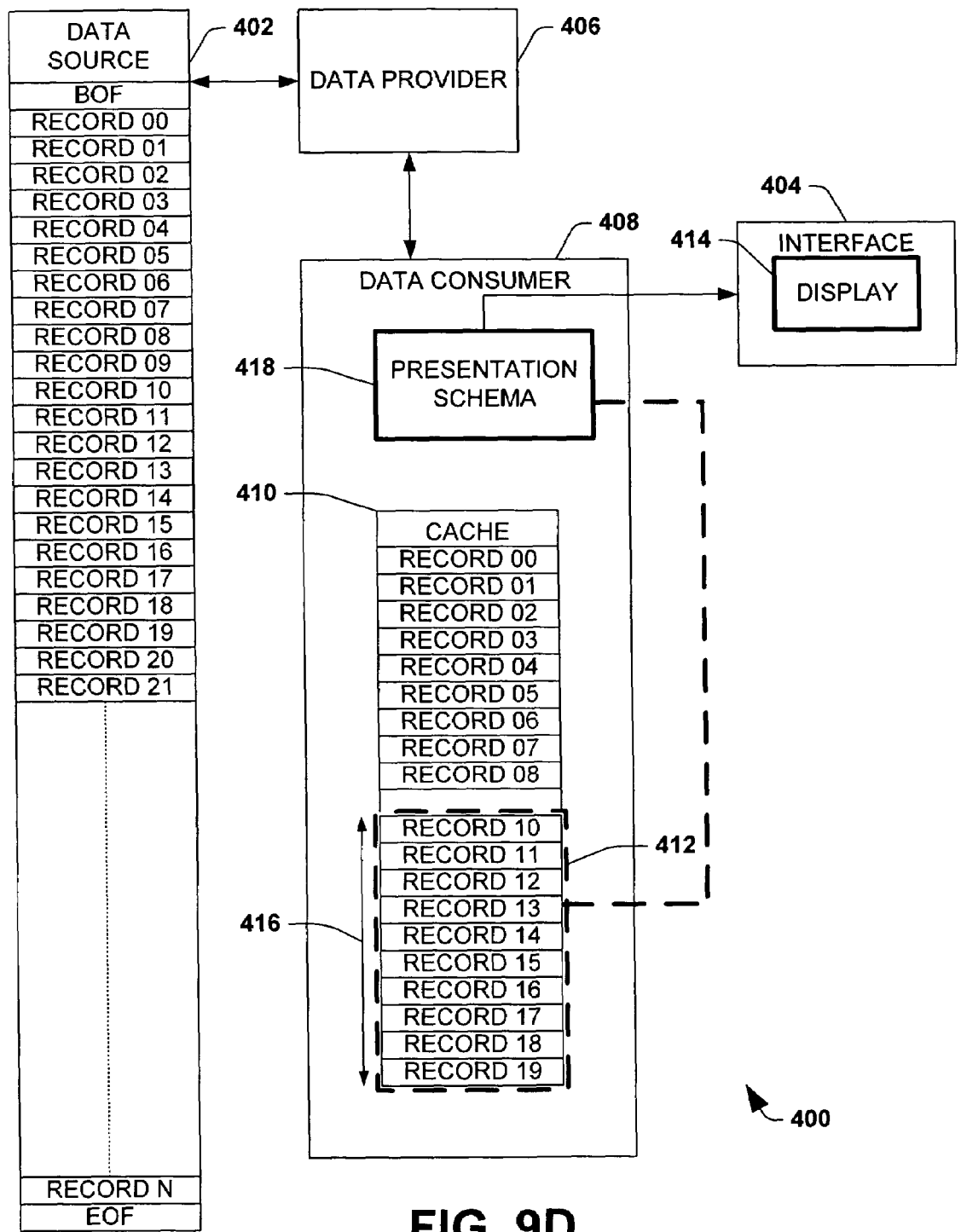
FIG. 9D is a schematic diagram further illustrating the system of FIGS. 9A-9C.

Referring also to FIG. 9D, this process may be repeated according to another user attempt to scroll the display window 412 downward, whereby additional data records RECORD 15 through RECORD 19 are obtained from the data source 402 via message interchange between the data provider 406 and the data consumer 408, and stored or buffered in the cache 410. In this regard, it will be noted that the previously obtained data records RECORD 00 through RECORD 09 may be buffered in the cache 410, even though the user is not currently viewing them via the interface 404.

Figure 9E:
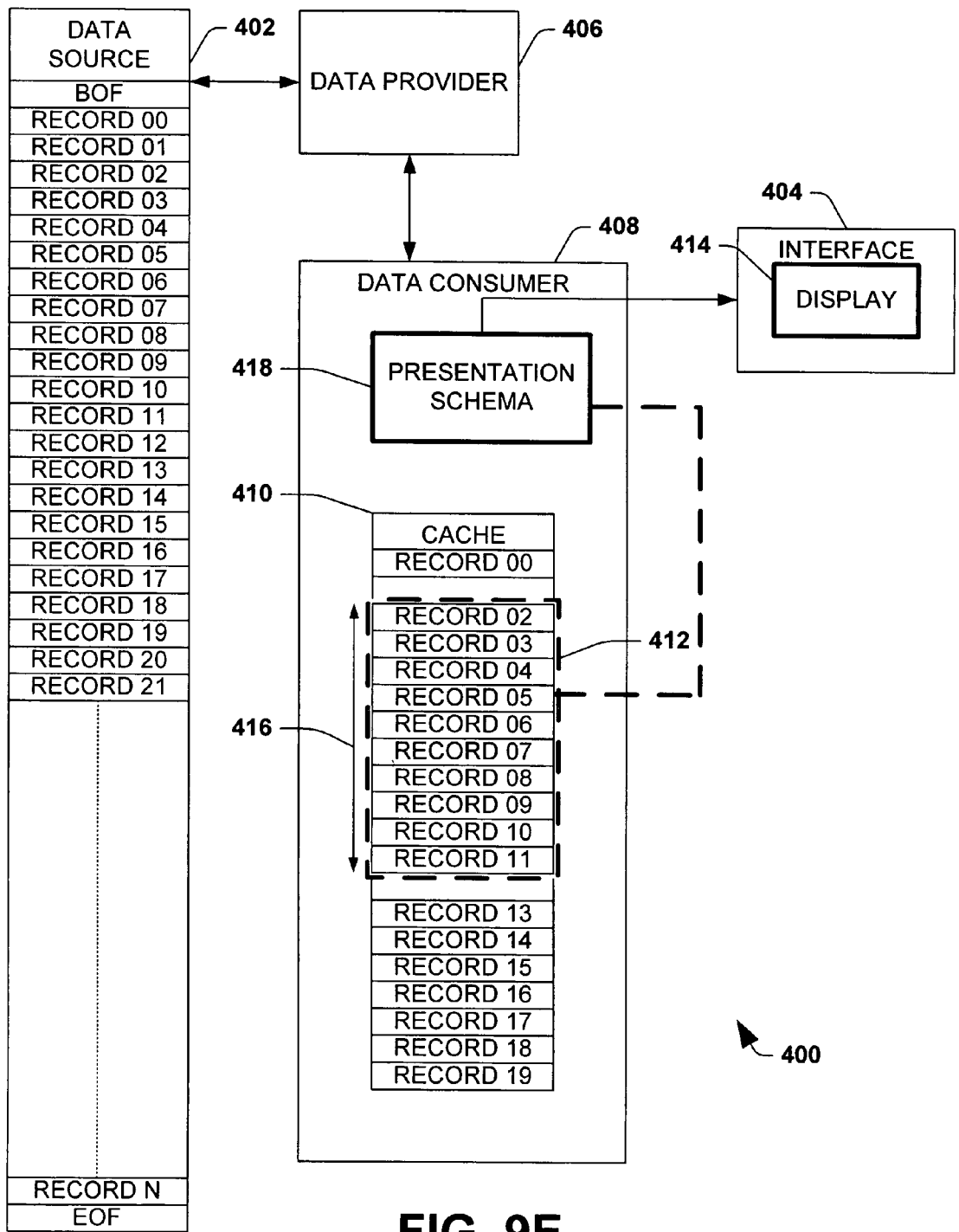
FIG. 9E is a schematic diagram further illustrating the system of FIGS. 9A-9D.

Referring also to FIG. 9E, this buffering allows the display window 412 to be scrolled back up to display data records RECORD 02 through RECORD 11 without obtaining any further data from the data source 402. Thus, the user may easily acquire and view a subset of data from the data source 402, without having to download the entire data set RECORD 00 through RECORD N. In addition, the data provider 406 may be adapted to provide the data consumer with error information (e.g., via the optional error component 196 of response message 190 in FIG. 5D), where an error occurs in accessing the data source 402, for example, where the EOF or BOF are encountered.

It will be noted at this point, that while an EOF error may be generated when a user attempts to scroll down past the last record available from the data source 402, where the data source 402 is changing (continuously or periodically), a subsequent attempt to scroll down by the user will cause a new request message to be generated, whereby recently received data records may be obtained from the data source 402, which may not have been available at the time of the EOF error. It will also be noted, that the invention allows the data consumer to be connected to various different data providers without modification, because the data consumer does not presuppose any particular data format or presentation schema.

The invention thus provides a generic, reusable data consumer, capable of obtaining and rendering a variety of disparate data types from sources of unknown, large, and/or changing length, to a user interface 404. In addition, it will be appreciated that additional origin request messages may be sent by the data consumer 408 in order to reacquire the presentation schema 418.

Figure 10A:
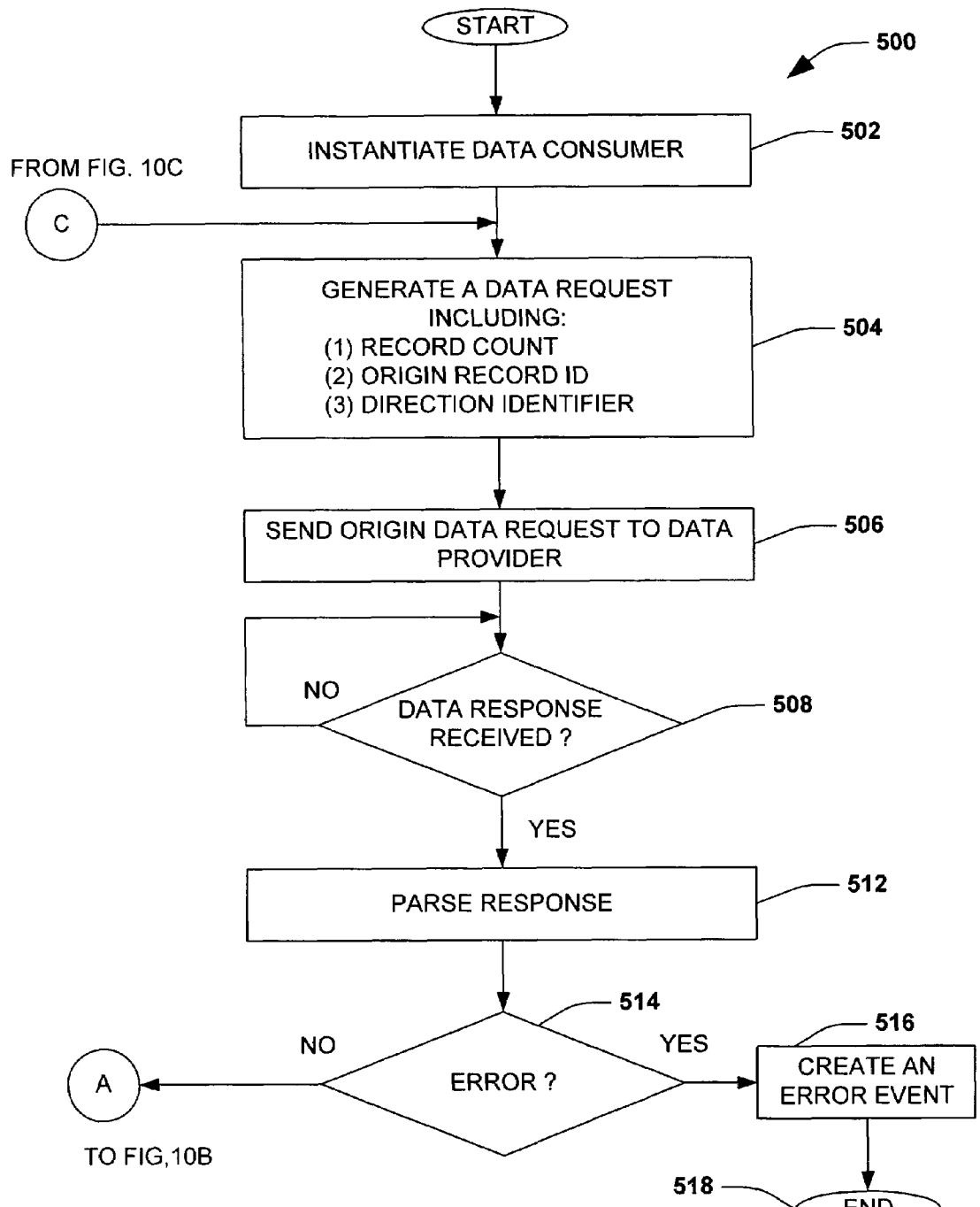
FIG. 10A is a flow diagram illustrating another exemplary method of rendering data from a data provider to an interface in accordance with another aspect of the invention.
Figure 10B:
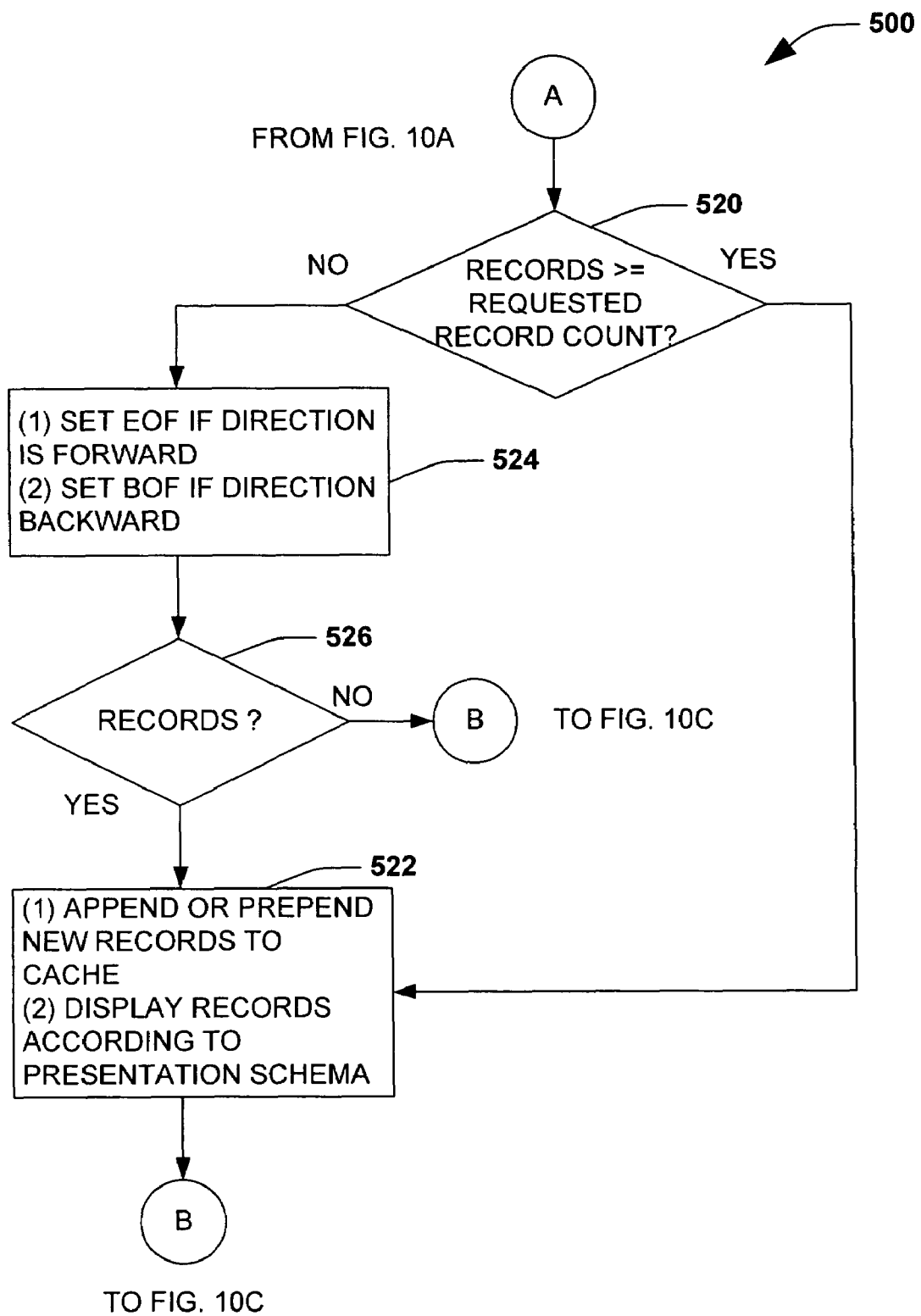
FIG. 10B is a flow diagram further illustrating the method of FIG. 10A.
Figure 10C:
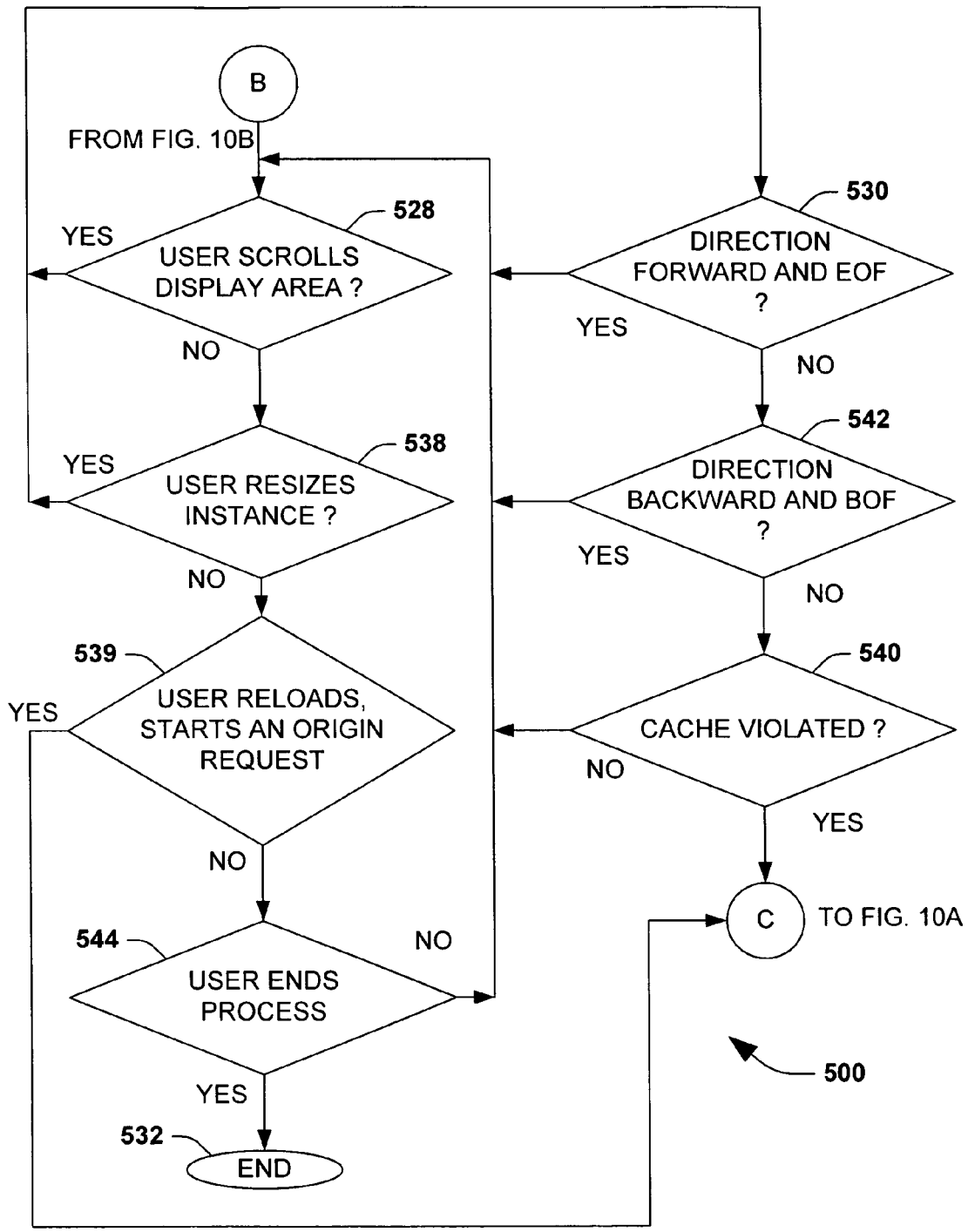
FIG. 10C is a flow diagram further illustrating the method of FIGS. 10A-10B.

Referring now to FIGS. 10A through 10C, another exemplary method 500 for rendering data from a data provider to an interface is illustrated, beginning at step 502, where a data consumer (e.g., consumer 6 of FIG. 1) component is instantiated. As a user interfacing with the data consumer (e.g., via interface 10) desires data from a data source, the data consumer generates a data request including a record count and an origin record ID at step 504. Where the data request is a non-origin request, or where the relative position of the desired data with respect to the origin record ID is not implied, the data request message may further include a direction identifier providing such information. The data request is sent to a data provider at step 506, after which the data consumer waits for a data response at step 508. The method 500 may include timeout checks (not shown) at step 508, for example, whereby an error event may be fired if no data response is received in a given time period (e.g., N minutes, where N is an integer which may be adjusted by a user). Once a response is received, the data consumer parses the response at step 512, and checks for errors at step 514. If an error condition exists, an error event is created at step 516, and the method ends at step 518.

Referring also to FIG. 10B, if no error condition exists, the data consumer determines whether the records in the response equal or exceed the requested record count at decision step 520. If so, the records are appended (or prepended) to the cache at step 522, and are displayed according to a presentation schema received from the data provider. If the records in the response are less than the requested record count at step 520, an EOF is set if the user is paging in a forward direction or a BOF is set if the user is paging in a backwards direction at step 524. Thereafter, at step 526, the data consumer determines whether any records have been received. If so, the records are appended (or prepended) to the cache at step 522, and are displayed according to a presentation schema received from the data provider, and the method 500 proceeds to step 528 as illustrated in FIG. 10C. If not, the method 500 proceeds directly to step 528 of FIG. 10C.

Referring now to FIG. 10C, once the records have been appended (or prepended) to the cache and displayed at step 522, the method 500 determines whether the user has scrolled the display area at step 528. If so, the data consumer determines whether the user is paging forward and an EOF has been encountered at step 530, or whether the user is paging backwards and a BOF has been encountered at step 542. If either is true, the method continues at step 528. If neither, the method proceeds to step 540 where it is determined whether a cache violation has occurred. If so, the method 500 proceeds to step 504 of FIG. 10A, and if not, the method 500 returns to step 528. If the user did not scroll the display area at step 528, the data consumer determines whether the user resized the instance at step 538. If so, the method proceeds to step 530, as described supra. If not, the data consumer determines at step 539 whether the user has reloaded and started an origin request. If not, the method 500 proceeds to step 544 where it is determined whether the user has ended the process. If so, the method ends at step 532, and if not, the method proceeds to step 528 as described supra. If it is determined at step 539 that the user has reloaded and started an origin request, method 500 proceeds to step 504 of FIG. 10A.

Figure 11A:
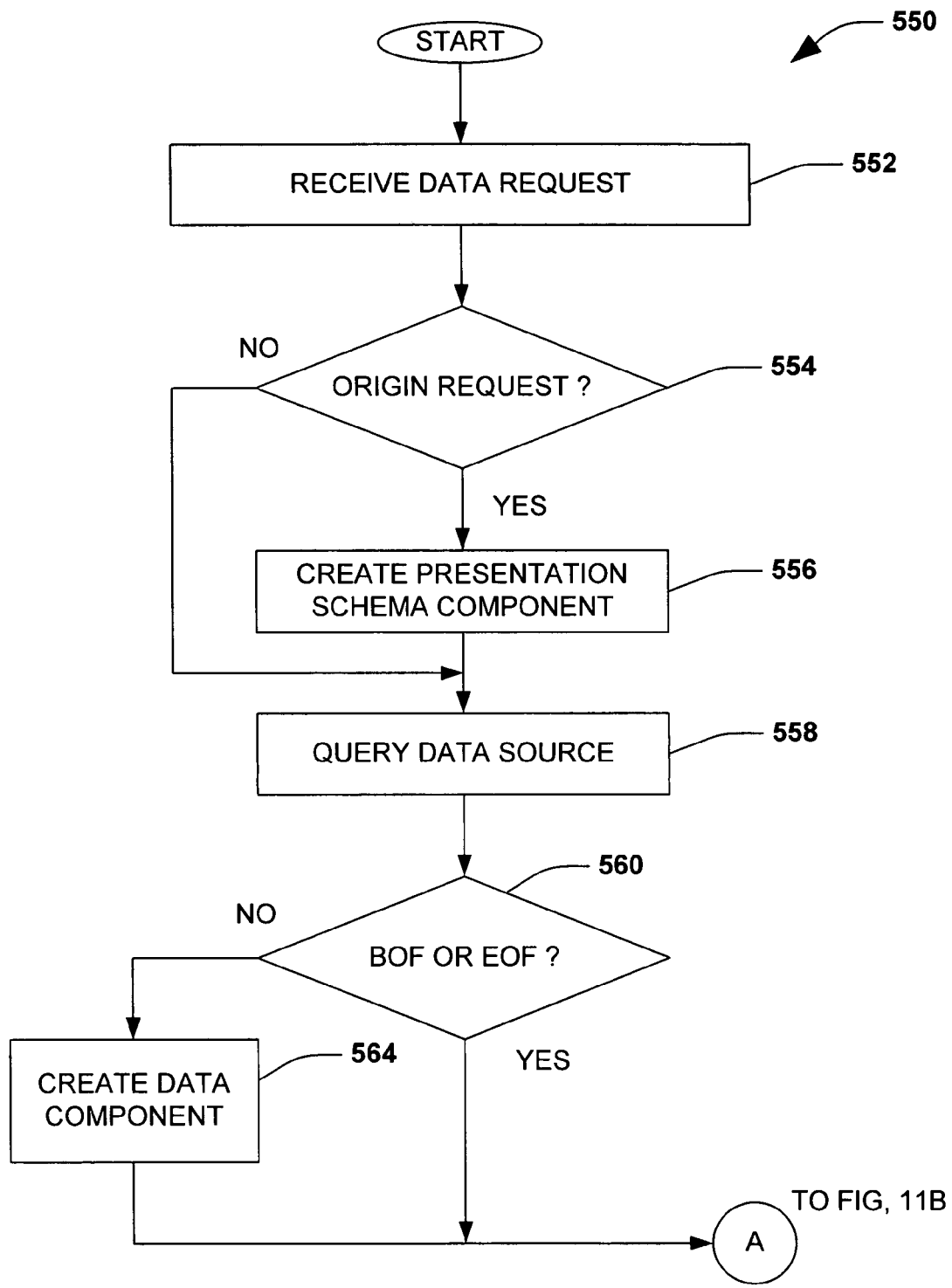
FIG. 11A is a flow diagram illustrating another exemplary method of providing data from a data source to a data consumer in accordance with another aspect of the invention.
Figure 11B:
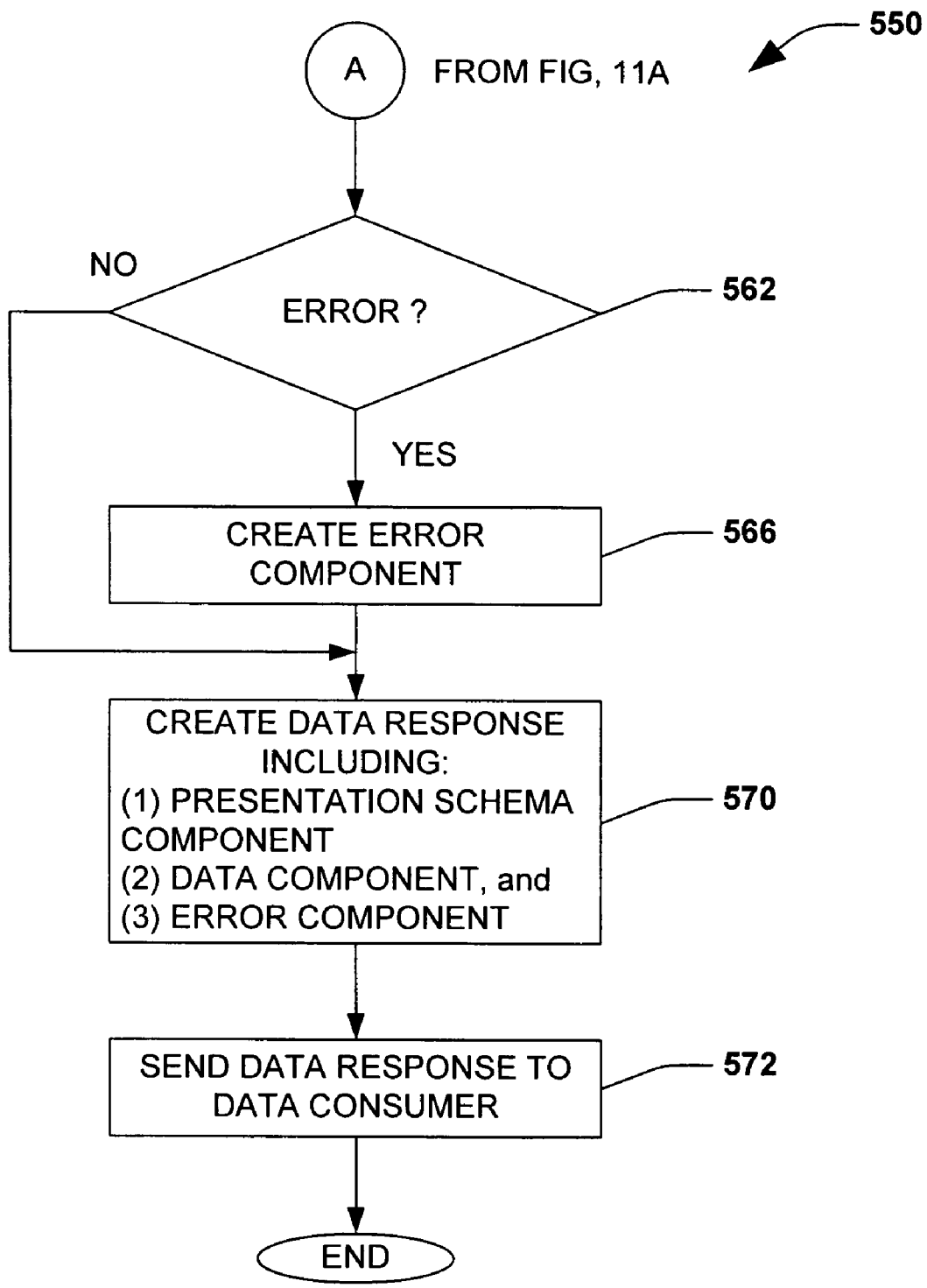
FIG. 11B is a flow diagram further illustrating the method of FIG. 11A.

Referring now to FIGS. 11A and 11B, another exemplary method 550 for providing data from a data source to a data consumer is illustrated beginning at step 552 whereat a data request is received (e.g. from a data consumer). If the request is an origin request, at step 554, a presentation schema component is created at step 556, and the data source is queried at step 558. If the request is not an origin request, no presentation schema is created, and the data source is queried at step 558. Thereafter, decision step 560 determines whether an EOF or BOF has been encountered in the data source. If so, the data provider checks for error conditions at step 562 of FIG. 11B. If not, a data component is created at step 564, before error conditions are checked at step 562. If an error condition exists, an error component is created at step 566. If not, no error component is created. In either case, the method 550 then proceeds to step 570, where a data response is created including a presentation schema component (if created at step 556), the data component (if created at step 564) and/or the error component (if created at step 566). Thereafter, the data response is sent to the data consumer at step 572.

Exemplary Operating Environment

Figure 12:
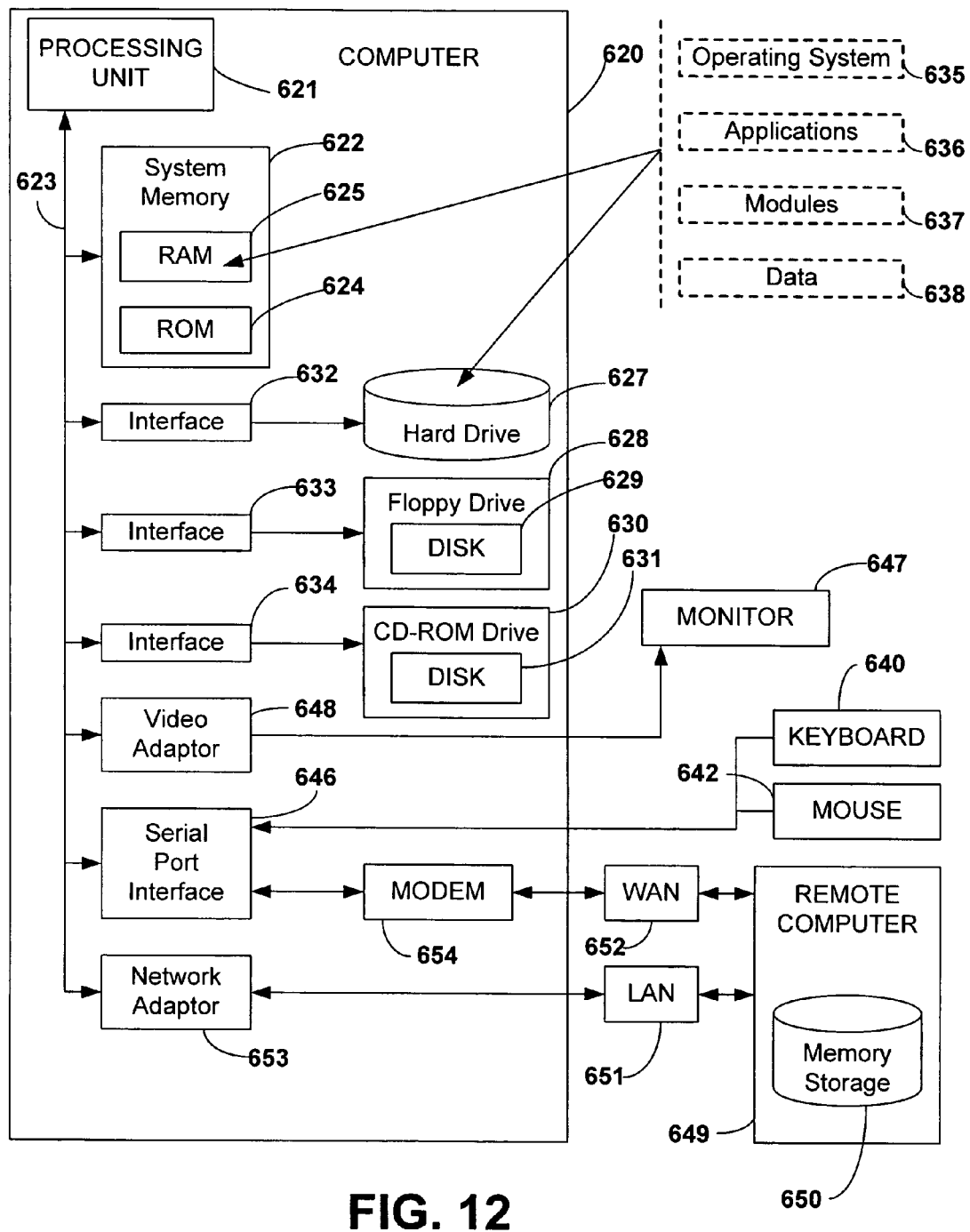
FIG. 12 is a schematic diagram illustrating an exemplary operating environment in which the various aspects of the invention may be carried out.

In order to provide a context for the various aspects of the invention, FIG. 12 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary system for implementing the various aspects of the invention includes a conventional server computer 420, including a processing unit 621, a system memory 622, and a system bus 623 that couples various system components including the system memory to the processing unit 621. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multiprocessor architectures also can be used as the processing unit 621.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 624 and random access memory (RAM) 625. A basic input/output system (BIOS), containing the basic routines that help to transfer information between elements within the server computer 620, such as during start-up, is stored in ROM 624.

The server computer 620 further includes a hard disk drive 627, a magnetic disk drive 628, e.g., to read from or write to a removable disk 629, and an optical disk drive 630, e.g., for reading a CD-ROM disk 631 or to read from or write to other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer-readable media provide nonvolatile storage of data, data structures, computer-executable instructions, etc. for the server computer 620. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 625, including an operating system 635, one or more application programs 636, other program modules 637, and program data 638. The operating system 635 in the illustrated computer is the Microsoft Windows NT Server operating system, together with the before mentioned Microsoft Transaction Server.

A user may enter commands and information into the server computer 620 through a keyboard 640 and a pointing device, such as a mouse 642. Other input devices (not shown) may include a microphone, a joystick, a game pad, a satellite dish, a scanner, or the like. These and other input devices are often connected to the processing unit 621 through a serial port interface 646 that is coupled to the system bus, but may be connected by other interfaces, such as a parallel port, a game port or a universal serial bus (USB). A monitor 647 or other type of display device is also connected to the system bus 623 via an interface, such as a video adapter 648. In addition to the monitor, computers typically include other peripheral output devices (not shown), such as speakers and printers.

The server computer 620 may operate in a networked environment using logical connections to one or more remote computers, such as a remote client computer 649. The remote computer 649 may be a workstation, a server computer, a router, a peer device or other common network node, and typically includes many or all of the elements described relative to the server computer 620, although only a memory storage device 650 is illustrated in FIG. 12. The logical connections depicted in FIG. 12 include a local area network (LAN) 651 and a wide area network (WAN) 652. Such networking environments are commonplace in offices, enterprise-wide computer networks, intranets and the Internet.

When used in a LAN networking environment, the server computer 620 is connected to the local network 651 through a network interface or adapter 653. When used in a WAN networking environment, the server computer 620 typically includes a modem 654, or is connected to a communications server on the LAN, or has other means for establishing communications over the wide area network 652, such as the Internet. The modem 654, which may be internal or external, is connected to the system bus 623 via the serial port interface 646. In a networked environment, program modules depicted relative to the server computer 620, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 620, unless otherwise indicated. Such acts and operations are sometimes referred to as being computer-executed. It will be appreciated that the acts and symbolically represented operations include the manipulation by the processing unit 621 of electrical signals representing data bits which causes a resulting transformation or reduction of the electrical signal representation, and the maintenance of data bits at memory locations in the memory system (including the system memory 622, hard drive 627, floppy disks 629, and CD-ROM 631) to thereby reconfigure or otherwise alter the computer system's operation, as well as other processing of signals. The memory locations where such data bits are maintained are physical locations that have particular electrical, magnetic, or optical properties corresponding to the data bits.

Although the invention has been shown and described with respect to a certain aspects and implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary aspects of the invention.

In this regard, it will also be recognized that the invention includes a computer-readable medium having computer-executable instructions for performing the steps of the various methods of the invention. In addition, while a particular feature of the invention may have been disclosed with respect to only one of several implementations, such feature may be combined with one or more other features of the other aspects as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A method of obtaining data from a data set of a data source and rendering the data to an interface, comprising:
   sending a first request message to a data provider, the first request message including a length parameter indicating an amount of data the data provider is to send, wherein the length parameter limits the amount of data that is to be sent in reply to the first request message, regardless of the actual size of the data source's data set;

receiving a first response message from the data provider in response to the first request message, the first response message comprising the amount of data indicated by the length parameter such that a user does not have to wait for the entire data set to be downloaded, the first response message further having a schema component and a data component, wherein the data component includes at least one data record having at least one data element requested by the first request message and the schema component includes a name component, a display component, and a type component containing presentation information for rendering the at least one data element in the at least one data record, the type component instructing the interface whether the at least one data element is to be displayed as an image or displayed as HTML, wherein because the user obtains the schema with each data request, the interface can dynamically render a continually changing data set;

buffering the data elements of the data set without buffering the presentation information, such that redundant presentation information is not stored while the data elements are stored; and dynamically rendering data from the data component to the interface according to the schema component.

2. The method of claim 1, wherein the act of rendering data from the data component to the interface according to the schema component comprises providing a presentation language representation of the at least one data element of the at least one data record to the interface according to the schema component associated therewith.

3. The method of claim 2, wherein the presentation language representation is at least one of HTML, DHTML, postscript, java script, visual basic script, java, or visual C++.

4. The method of claim 2, wherein the display component has a binary display value and the type component has a binary type value.

5. The method of claim 4, wherein the act of providing the presentation language representation comprises:
displaying the at least one data element of the at least one data record via the interface when the display value is one;
hiding the at least one data element of the at least one data record when the display value is zero;
displaying the at least one data element of the at least one data record as an image via the interface when the display value is one and the type value is one; and
displaying the at least one data element of the at least one data record as HTML via the interface when the display value is one and the type value is zero.

6. The method of claim 1, wherein the first request message includes an origin record identifier and a record count identifier.

7. The method of claim 6, the act of rendering further comprises providing a presentation language representation of the at least one data record having at least one data element to the interface including a binary display value and a binary type value and rendering the data based upon the binary display value and the binary type value, wherein the binary display value indicates whether the at least one data element is to be hidden, and the binary type value indicates whether the at least one data element is to be displayed as an image or alternately as an HTML element.

8. The method of claim 7, wherein the record count identifier comprises an integer representing a number of records desired from the data source; wherein the data component comprises an integer number of data records having at least one data element, the integer number being equal to the record count identifier; and wherein rendering data from the data component to the interface according to the schema component comprises providing a presentation language representation of the at least one data element of the integer number of data records to the interface according to the name component, display component and type component associated therewith.

9. The method of claim 1, further comprising:
sending a subsequent request message to the data provider, the subsequent request message having a record identifier and a record count identifier;
receiving a subsequent response message from the data provider, the subsequent response message having a data component and not having a schema component; and
rendering data from the data component of the subsequent response message to the interface according to the schema component of the first response message.

10. A computer readable storage medium having stored thereon computer executable instructions for carrying out the method of claim 1.

11. A system embodied on a computer-readable storage medium for obtaining data from a data set of a data source and presenting the data to an interface comprising:
a data consumer in communication with the interface and adapted to send a first request message to a data provider, the first request message having an origin record identifier and a record count identifier, the first request message further including a length parameter indicating an amount of data the data provider is to send, wherein the length parameter limits the amount of data that is to be sent in reply to the first request message, regardless of the actual size of the data source's data set;
wherein the data provider sends a first response message to the data consumer, the first response message comprising the amount of data indicated by the length parameter such that a user does not have to wait for the entire data set to be downloaded, the first response message further having a schema component and a data component including data from the data source requested by the first request message, the schema component providing presentation information used by the data consumer to create an appropriate display language representation of the data, wherein because the user obtains the schema with each data request, the interface can dynamically render a continually changing data set;
wherein the data consumer buffers the data elements of the data set without buffering the presentation information, such that redundant presentation information is not stored while the data elements are stored; and
wherein the data consumer dynamically renders the data to the interface according to the schema component.

12. The system of claim 11, wherein the data consumer is provides a presentation language representation of the data to the interface according to the schema component.

13. The system of claim 12, wherein the presentation language representation is at least one of HTML, DHTML, postscript, java script, visual basic script, java, or visual C++.

14. The system of claim 11,
wherein the data consumer sends a subsequent request message having a record identifier and a record count identifier; wherein the data provider sends a subsequent response message to the data consumer having a subsequent data component including data from the data source and not having a schema component;

wherein the data consumer renders data from the subsequent data component of the subsequent response message to the interface according to the schema component of the first response message; and wherein the data provider sends an unsolicited response message to the data consumer having an updated schema component upon detection of a change to the data source format.

15. The system of claim 14, wherein the data consumer provides a presentation language representation of the data from the subsequent data component according to the schema component.

16. The system of claim 15, wherein the presentation language representation of the data from the subsequent data component is one of HTML, DHTML, postscript, java script, visual basic script, java, and visual C++.

17. A computer readable medium having stored thereon computer executable instructions for carrying out a system including a data provider for providing data from a data set of a data source to an interface of a data consumer, the system comprising:

means for receiving a first request message from the data consumer, the first request message having an origin record identifier and a record count identifier, the first request message further including a length parameter indicating an amount of data the data provider is to send, wherein the length parameter limits the amount of data that is to be sent in reply to the first request message, regardless of the actual size of the data source's data set;

means for constructing a first response message comprising the amount of data indicated by the length parameter such that a user does not have to wait for the entire data set to be downloaded, the first response message further having a schema component and a first data component according to the origin record identifier and the record count identifier, wherein the first data component includes data from the data source requested by the first request message, wherein the first data component includes at least one data record having at least one data element and the schema component includes a name component, a title component, a width component, an alignment component, a display component, and a type component containing presentation information for rendering the at least one data element in the at least one data record, wherein because the user obtains the schema with each data request, the interface can dynamically render a continually changing data set;

means for sending the first response message to the data consumer;

means for buffering the data elements of the data set without buffering the presentation information, such that redundant presentation information is not stored while the data elements are stored;

means for dynamically rendering data from the first data component on an interface according to the schema component;

means for receiving a subsequent request message from the data consumer;

means for constructing a first subsequent response message upon receiving the subsequent request message, the subsequent response message having a second data component and not having a schema component;

means for sending the first subsequent response message to the data consumer; means for rendering data from the second data component to an interface according to the schema component from the first response message;

means for constructing a second subsequent response message having an updated schema component upon detection of a change to the data source format, the updated schema component reflecting the updated data source format; and means for sending the second subsequent response message to the data consumer without solicitation by a request message.

18. The computer readable medium of claim 17, further comprising:

means for rendering data from the data component to an interface according to the most recently received schema component comprising means for providing a presentation language representation of the at least one data record having at least one data element to the interface employing a binary display value and a binary type value included in the schema component and means for rendering the data based upon the binary display value and the binary type value.

* * * * *